United States Patent
Khoshnevisan et al.

(10) Patent No.: US 11,647,504 B2
(45) Date of Patent: May 9, 2023

(54) PUCCH CARRYING HARQ-A FOR MULTI-TRP WITH NON-IDEAL BACKHAUL

(71) Applicant: QUALCOMM incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 16/719,937

(22) Filed: Dec. 18, 2019

(65) Prior Publication Data

US 2020/0205149 A1    Jun. 25, 2020

Related U.S. Application Data

(60) Provisional application No. 62/783,792, filed on Dec. 21, 2018.

(51) Int. Cl.
*H04W 4/00* (2018.01)
*H04W 72/04* (2023.01)
(Continued)

(52) U.S. Cl.
CPC ....... *H04W 72/0413* (2013.01); *H04L 1/1887* (2013.01); *H04W 72/042* (2013.01); *H04W 72/044* (2013.01)

(58) Field of Classification Search
CPC .... H04L 5/0053; H04L 5/0055; H04L 5/0057
See application file for complete search history.

(56) References Cited

U.S. PATENT DOCUMENTS

2014/0341142 A1   11/2014   Fujita
2018/0206132 A1   7/2018    Guo et al.
(Continued)

FOREIGN PATENT DOCUMENTS

WO   WO-2018228487 A1   12/2018

OTHER PUBLICATIONS

International Search Report and Written Opinion—PCT/US2019/067539—ISA/EPO—dated Apr. 28, 2020.
(Continued)

*Primary Examiner* — Bo Hui A Zhu
(74) *Attorney, Agent, or Firm* — Holland & Hart LLP

(57) ABSTRACT

Methods, systems, and devices for wireless communications that support physical uplink control channel (PUCCH) carrying hybrid automatic repeat request (HARQ-A) for multiple transmission reception point (multi-TRP) environments with non-ideal backhaul links are described. A user equipment (UE) may support multiple communication links with TRPs and receive distinct physical downlink control channel (PDCCH) messages that include downlink control information (DCI). The DCI may include a timing or resource indication index values for physical uplink control channel (PUCCH) transmission. Based on the index values, the UE may differentiate the received DCI indications. The UE may then schedule PUCCH transmissions, including hybrid automatic repeat request (HARQ) payloads, directed to the TRPs. In some examples, the scheduling may include mapping the PUCCH transmissions to resources or resource groups in configured PUCCH resource set. The UE may then transmit the PUCCH messages via one or more determined beams based on the indication index values.

51 Claims, 15 Drawing Sheets

(51) Int. Cl.
*H04L 1/1867* (2023.01)
*H04W 72/044* (2023.01)

(56) References Cited

U.S. PATENT DOCUMENTS

| | | | |
|---|---|---|---|
| 2018/0324773 A1 | 11/2018 | Fu et al. | |
| 2019/0379506 A1* | 12/2019 | Cheng | H04W 4/02 |
| 2021/0218539 A1* | 7/2021 | Hu | H04L 1/1861 |
| 2021/0227560 A1* | 7/2021 | Shao | H04L 5/0007 |
| 2022/0046672 A1* | 2/2022 | Yuan | H04L 5/0053 |

OTHER PUBLICATIONS

NTT DOCOMO, et al., "Physical Layer Enhancements for NR URLLC", 3GPP Draft, 3GPP TSG RAN WG1 Meeting #94, R1-1809163_URLLC Layer 1 Enhancement, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516533, 16 pages, Retrieved from the Internet: URL: http://www.3gpp.org/ftp/tsg%5Fran/WG1%5FRL1/TSGR1%5F94/Docs/R1%2D1809163%2Ezip. [retrieved on Aug. 11, 2018] pp. 6-8, 3. UCI enhancements pp. 8-10, 4. PUSCH enhancements pp. 11-12, 5. Enhancements to scheduling/HARQ/CSI processing timeline.

* cited by examiner

PUCCH CARRYING HARQ-A FOR MULTI-TRP WITH NON-IDEAL BACKHAUL

CROSS REFERENCE

The present Application for Patent claims the benefit of U.S. Provisional Patent Application No. 62/783,792 by KHOSHNEVISAN et al., entitled "PUCCH CARRYING HARQ-A FOR MULTI-TRP WITH NON-IDEAL BACKHAUL," filed Dec. 21, 2018, assigned to the assignee hereof, and expressly incorporated herein.

BACKGROUND

The following relates generally to wireless communications, and more specifically to a physical uplink control channel (PUCCH) carrying hybrid automatic repeat request (HARQ-A) for multiple transmission reception point (multi-TRP) environments with non-ideal backhaul links.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support a physical uplink control channel (PUCCH) carrying hybrid automatic repeat request (HARQ-A) for multiple transmission reception point (multi-TRP) environments with non-ideal backhaul links. Generally, the described techniques provide for physical uplink control channel (PUCCH) resource differentiation and scheduling.

A UE may support multiple communication links with TRPs coordinated over a non-ideal backhaul link. To transmit downlink information, the TRPs may each transmit physical downlink control channel (PDCCH) messages that include downlink control information (DCI). The DCI may schedule subsequent physical downlink shared channel (PDSCH) data transmission and include indications for PUCCH scheduling at the UE. The indications may include a timing indicator value for HARQ feedback or a PUCCH resource indicator (PRI) value. Based on the indications, the UE may differentiate the received DCI indications. The UE may schedule PUCCH transmissions containing uplink control information (UCI) directed to the TRPs. In some examples, the scheduling may include mapping the PUCCH transmissions to resources or resource groups in configured PUCCH resource set. The UE may then transmit the PUCCH messages via one or more determined beams based on the indications.

A method of wireless communication at a UE is described. The method may include receiving a first downlink control message from a first transmission reception point and a second downlink control message from a second transmission reception point, determining, based on the receiving, that downlink control information of the first downlink control message is associated with the first transmission reception point and that downlink control information of the second downlink control message is associated with the second transmission reception point, identifying a first index value in the downlink control information of the first downlink control message and a second index value in the downlink control information of the second downlink control message, and transmitting, based on the first index value and the second index value, a first uplink control message and a second uplink control message.

An apparatus for wireless communication at a UE is described. The apparatus may include a processor, memory in electronic communication with the processor, and instructions stored in the memory. The instructions may be executable by the processor to cause the apparatus to receive a first downlink control message from a first transmission reception point and a second downlink control message from a second transmission reception point, determine, based on the receiving, that downlink control information of the first downlink control message is associated with the first transmission reception point and that downlink control information of the second downlink control message is associated with the second transmission reception point, identify a first index value in the downlink control information of the first downlink control message and a second index value in the downlink control information of the second downlink control message, and transmit, based on the first index value and the second index value, a first uplink control message and a second uplink control message.

Another apparatus for wireless communication at a UE is described. The apparatus may include means for receiving a first downlink control message from a first transmission reception point and a second downlink control message from a second transmission reception point, determining, based on the receiving, that downlink control information of the first downlink control message is associated with the first transmission reception point and that downlink control information of the second downlink control message is associated with the second transmission reception point, identifying a first index value in the downlink control information of the first downlink control message and a second index value in the downlink control information of the second downlink control message, and transmitting, based on the first index value and the second index value, a first uplink control message and a second uplink control message.

A non-transitory computer-readable medium storing code for wireless communication at a UE is described. The code may include instructions executable by a processor to receive a first downlink control message from a first transmission reception point and a second downlink control message from a second transmission reception point, determine, based on the receiving, that downlink control information of the first downlink control message is associated with the first transmission reception point and that downlink control information of the second downlink control message is associated with the second transmission reception point, identify a first index value in the downlink control information of the first downlink control message and a second index value in the downlink control information of the second downlink control message, and transmit, based on the first index value and the second index value, a first uplink control message and a second uplink control message.

In some examples of the method, apparatuses, and non-transitory computer-readable medium described herein, the first uplink control message comprises a first hybrid automatic repeat request payload and the second uplink control message comprises a second hybrid automatic repeat request payload.

Some examples of the method, apparatuses, and non-transitory computer-readable medium described herein may further include operations, features, means, or instructions for receiving a radio resource control message including an indication of semi-static coordination and a splitting of resources in the uplink control message between the first transmission reception point and the second transmission reception point, and where the determining further includes determining, based on the indication, a first configured resource set for the first transmission reception point and a second configured resource set for the second transmission reception point in the uplink control message.

In some examples of the method, apparatuses, and non-transitory computer-readable medium described herein, the first configured resource set includes a first set of time and frequency resources associated with the first transmission reception point and the second configured resource set includes a second set of time and frequency resources, different from the first set of time and frequency resources, and associated with the second transmission reception point.

Some examples of the method, apparatuses, and non-transitory computer-readable medium described herein may further include operations, features, means, or instructions for receiving a first indication in the downlink control information of the first downlink control message and a second indication in the downlink control information of the second downlink control message, and where the determining may be based on the first indication or the second indication.

In some examples of the method, apparatuses, and non-transitory computer-readable medium described herein, the first indication includes an explicit or implicit indication and the second indication includes an explicit or implicit indication.

In some examples of the method, apparatuses, and non-transitory computer-readable medium described herein, the identifying further may include operations, features, means, or instructions for identifying a first set of time and frequency resources in the uplink control message based on the first index value, and identifying a second set of time and frequency resources in the uplink control message based on the second index value.

Some examples of the method, apparatuses, and non-transitory computer-readable medium described herein may further include operations, features, means, or instructions for scheduling uplink control information for the first transmission reception point on the first set of time and frequency resources, and scheduling uplink control information for the second transmission reception point on the second set of time and frequency resources.

In some examples of the method, apparatuses, and non-transitory computer-readable medium described herein, the first set of time and frequency resources includes resources in a first slot of the first uplink control message and the second set of time and frequency resources includes resources in a second slot of the second uplink control message.

In some examples of the method, apparatuses, and non-transitory computer-readable medium described herein, the first set of time and frequency resources includes resources in a first set of orthogonal frequency division multiplexed symbols in a slot of the first uplink control message and the second set of time and frequency resources includes resources in a second set of orthogonal frequency division multiplexed symbols, different from the first set of orthogonal frequency division multiplexed symbols, in the slot of the second uplink control message.

In some examples of the method, apparatuses, and non-transitory computer-readable medium described herein, the transmitting further may include operations, features, means, or instructions for determining a first activated beam index corresponding to the first beam, the first activated beam index included in a set of beam indices configured by a radio resource control configuration, and determining a second activated beam index corresponding to the second beam, the second activated beam index included in the set of beam indices.

Some examples of the method, apparatuses, and non-transitory computer-readable medium described herein may further include operations, features, means, or instructions for determining the first activated beam index may be based on a first resource indication value for uplink control transmission in the downlink control information of the first downlink control message, and where determining the second activated beam index may be based on a second resource indication value for uplink control transmission in the downlink control information of the second downlink control message.

Some examples of the method, apparatuses, and non-transitory computer-readable medium described herein may further include operations, features, means, or instructions for determining the first activated beam index may be based on the determining that downlink control information of the first downlink control message may be associated with the first transmission reception point, and where determining the second activated beam index may be based on the determining that downlink control information of the second downlink control message may be associated with the second transmission reception point.

Some examples of the method, apparatuses, and non-transitory computer-readable medium described herein may further include operations, features, means, or instructions for determining the first activated beam index may be based on the first index value, and where determining the second activated beam index may be based on the second index value.

In some examples of the method, apparatuses, and non-transitory computer-readable medium described herein, the first index value includes a first feedback timing indicator value from a first configured or default set of feedback timing indicator values and the second index value includes a second feedback timing indicator value from a second configured or default set of feedback timing indicator values.

In some examples of the method, apparatuses, and non-transitory computer-readable medium described herein, the first configured or default set of feedback timing indicator values includes at least one feedback timing indicator value different from the second configured or default set of feedback timing indicator values.

A method of wireless communication at a UE is described. The method may include receiving a first downlink control message from a first transmission reception point and a second downlink control message from a second transmission reception point, determining, based on the receiving, that downlink control information of the first downlink control message includes a first resource indication value for the first transmission reception point and that downlink control information of the second downlink control message includes a second resource indication value for the second transmission reception point, identifying a first resource group associated with the first resource indication value and a second resource group associated with the second resource indication value, and transmitting, based on the first resource group and the second resource group, a first uplink control message and a second uplink control message.

An apparatus for wireless communication at a UE is described. The apparatus may include a processor, memory in electronic communication with the processor, and instructions stored in the memory. The instructions may be executable by the processor to cause the apparatus to receive a first downlink control message from a first transmission reception point and a second downlink control message from a second transmission reception point, determine, based on the receiving, that downlink control information of the first downlink control message includes a first resource indication value for the first transmission reception point and that downlink control information of the second downlink control message includes a second resource indication value for the second transmission reception point, identify a first resource group associated with the first resource indication value and a second resource group associated with the second resource indication value, and transmit, based on the first resource group and the second resource group, a first uplink control message and a second uplink control message.

Another apparatus for wireless communication at a UE is described. The apparatus may include means for receiving a first downlink control message from a first transmission reception point and a second downlink control message from a second transmission reception point, determining, based on the receiving, that downlink control information of the first downlink control message includes a first resource indication value for the first transmission reception point and that downlink control information of the second downlink control message includes a second resource indication value for the second transmission reception point, identifying a first resource group associated with the first resource indication value and a second resource group associated with the second resource indication value, and transmitting, based on the first resource group and the second resource group, a first uplink control message and a second uplink control message.

A non-transitory computer-readable medium storing code for wireless communication at a UE is described. The code may include instructions executable by a processor to receive a first downlink control message from a first transmission reception point and a second downlink control message from a second transmission reception point, determine, based on the receiving, that downlink control information of the first downlink control message includes a first resource indication value for the first transmission reception point and that downlink control information of the second downlink control message includes a second resource indication value for the second transmission reception point, identify a first resource group associated with the first resource indication value and a second resource group associated with the second resource indication value, and transmit, based on the first resource group and the second resource group, a first uplink control message and a second uplink control message.

In some examples of the method, apparatuses, and non-transitory computer-readable medium described herein, the first uplink control message includes a first hybrid automatic repeat request payload and the second uplink control message comprises a second hybrid automatic repeat request payload.

Some examples of the method, apparatuses, and non-transitory computer-readable medium described herein may further include operations, features, means, or instructions for identifying the first resource indication value and the second resource indication value, and where the determining further includes, determining, based on the identifying, downlink control information of the first downlink control message may be associated with the first transmission reception point and the downlink control information of the second downlink control message may be associated with the second transmission reception point.

Some examples of the method, apparatuses, and non-transitory computer-readable medium described herein may further include operations, features, means, or instructions for identifying the first resource group may be based on a bit included in the first resource indication value, and where identifying the second resource group may be based on a bit included in the second resource indication value.

Some examples of the method, apparatuses, and non-transitory computer-readable medium described herein may further include operations, features, means, or instructions for identifying a first set of time and frequency resources in the first resource group based on one or more additional bits included in the first resource indication value, and identifying a second set of time and frequency resources in the second resource group based on one or more additional bits included in the second resource indication value.

Some examples of the method, apparatuses, and non-transitory computer-readable medium described herein may further include operations, features, means, or instructions for scheduling uplink control information for the first transmission reception point on the first set of time and frequency resources, and scheduling uplink control information for the second transmission reception point on the second set of time and frequency resources.

In some examples of the method, apparatuses, and non-transitory computer-readable medium described herein, the first set of time and frequency resources includes resources in a first slot of the first uplink control message and the second set of time and frequency resources includes resources in a second slot of the second uplink control message.

In some examples of the method, apparatuses, and non-transitory computer-readable medium described herein, the first set of time and frequency resources includes resources in a first set of orthogonal frequency division multiplexed symbols in a slot of the first uplink control message and the second set of time and frequency resources includes resources in a second set of orthogonal frequency division multiplexed symbols in the slot of the second uplink control message.

In some examples of the method, apparatuses, and non-transitory computer-readable medium described herein, the first set of time and frequency resources includes a first set of resource blocks within an orthogonal frequency division multiplexed symbol and the second set of time and frequency resources includes a second set of resource blocks within the orthogonal frequency division multiplexed symbol, the first set of resource blocks frequency division multiplexed with the second set of resource blocks.

In some examples of the method, apparatuses, and non-transitory computer-readable medium described herein, the first set of time and frequency resources corresponds to a first antenna array configuration of the UE and the second set of time and frequency resources corresponds to a second antenna array configuration of the UE.

In some examples of the method, apparatuses, and non-transitory computer-readable medium described herein, the transmitting further may include operations, features, means, or instructions for determining a first activated beam index corresponding to the first beam based on the first resource indication value, and determining a second activated beam index corresponding to the second beam based on the second resource indication value.

In some examples of the method, apparatuses, and non-transitory computer-readable medium described herein, the first activated beam index may be associated with the first resource group or an element of the first resource group and the second activated beam index may be associated with the second resource group or an element of the second resource group.

In some examples of the method, apparatuses, and non-transitory computer-readable medium described herein, the first activated beam index may be included in a first set of beam indices configured by radio resource control and the second activated beam index may be included in a second set of beam indices, different from the first set of beam indices, and configured by radio resource control.

Some examples of the method, apparatuses, and non-transitory computer-readable medium described herein may further include operations, features, means, or instructions for identifying a last downlink control information of the first downlink control message and a last downlink control information of the second downlink control message, and where the determining further includes, determining the first resource indication value based on identifying the last downlink control information of the first downlink control message and determining the second resource indication value based on identifying the last downlink control information of the second downlink control message.

In some examples of the method, apparatuses, and non-transitory computer-readable medium described herein, the first resource indication value includes a first physical uplink control channel resource indication index value and the second index value includes a second physical uplink control channel resource indication index value.

A method of wireless communication at a UE is described. The method may include receiving a first downlink control message from a first transmission reception point and a second downlink control message from a second transmission reception point, determining, based on the receiving, downlink control information of the first downlink control message is associated with the first transmission reception point and downlink control information of the second downlink control message is associated with the second transmission reception point, identifying that downlink control information of the first downlink control message includes a first resource indication value and that downlink control information of the second downlink control message includes a second resource indication value, and transmitting, based on the first resource indication value and the second resource indication value, a first uplink control message and a second uplink control message.

An apparatus for wireless communication at a UE is described. The apparatus may include a processor, memory in electronic communication with the processor, and instructions stored in the memory. The instructions may be executable by the processor to cause the apparatus to receive a first downlink control message from a first transmission reception point and a second downlink control message from a second transmission reception point, determine, based on the receiving, downlink control information of the first downlink control message is associated with the first transmission reception point and downlink control information of the second downlink control message is associated with the second transmission reception point, identify that downlink control information of the first downlink control message includes a first resource indication value and that downlink control information of the second downlink control message includes a second resource indication value, and transmit, based on the first resource indication value and the second resource indication value, a first uplink control message and a second uplink control message.

Another apparatus for wireless communication at a UE is described. The apparatus may include means for receiving a first downlink control message from a first transmission reception point and a second downlink control message from a second transmission reception point, determining, based on the receiving, downlink control information of the first downlink control message is associated with the first transmission reception point and downlink control information of the second downlink control message is associated with the second transmission reception point, identifying that downlink control information of the first downlink control message includes a first resource indication value and that downlink control information of the second downlink control message includes a second resource indication value, and transmitting, based on the first resource indication value and the second resource indication value, a first uplink control message and a second uplink control message.

A non-transitory computer-readable medium storing code for wireless communication at a UE is described. The code may include instructions executable by a processor to receive a first downlink control message from a first transmission reception point and a second downlink control message from a second transmission reception point, determine, based on the receiving, downlink control information of the first downlink control message is associated with the first transmission reception point and downlink control information of the second downlink control message is associated with the second transmission reception point, identify that downlink control information of the first downlink control message includes a first resource indication value and that downlink control information of the second downlink control message includes a second resource indication value, and transmit, based on the first resource indication value and the second resource indication value, a first uplink control message and a second uplink control message.

In some examples of the method, apparatuses, and non-transitory computer-readable medium described herein, the first uplink control message includes a first hybrid automatic repeat request payload and the second uplink control message comprises a second hybrid automatic repeat request payload.

Some examples of the method, apparatuses, and non-transitory computer-readable medium described herein may further include operations, features, means, or instructions for receiving a first indication in the downlink control information of the first downlink control message and a second indication in the downlink control information of the second downlink control message, and where the determining may be based on the first indication or the second indication.

In some examples of the method, apparatuses, and non-transitory computer-readable medium described herein, the first indication includes an explicit or implicit indication and the second indication includes an explicit or implicit indication.

Some examples of the method, apparatuses, and non-transitory computer-readable medium described herein may further include operations, features, means, or instructions for identifying a first resource group in the uplink control message based on the determining, the first resource group associated with the first transmission reception point, and identifying a second resource group in the uplink control message based on the determining, the second resource group associated with the second transmission reception point.

In some examples of the method, apparatuses, and non-transitory computer-readable medium described herein, the identifying further may include operations, features, means, or instructions for identifying a first set of time and frequency resources based on the first resource indication value, the first set of time and frequency resources included in a first resource group, and identifying a second set of time and frequency resources based on the second resource indication value, the second set of time and frequency resources included in a second resource group.

Some examples of the method, apparatuses, and non-transitory computer-readable medium described herein may further include operations, features, means, or instructions for scheduling uplink control information for the first transmission reception point on the first set of time and frequency resources, and scheduling uplink control information for the second transmission reception point on the second set of time and frequency resources.

In some examples of the method, apparatuses, and non-transitory computer-readable medium described herein, the first set of time and frequency resources includes resources in a first slot of the first uplink control message and the second set of time and frequency resources includes resources in a second slot of the second uplink control message.

In some examples of the method, apparatuses, and non-transitory computer-readable medium described herein, the first set of time and frequency resources includes resources in a first set of orthogonal frequency division multiplexed symbols in a slot of the first uplink control message and the second set of time and frequency resources includes resources in a second set of orthogonal frequency division multiplexed symbols in the slot of the second uplink control message.

In some examples of the method, apparatuses, and non-transitory computer-readable medium described herein, the first set of time and frequency resources includes a first set of resource blocks within an orthogonal frequency division multiplexed symbol and the second set of time and frequency resources includes a second set of resource blocks within the orthogonal frequency division multiplexed symbol, the first set of resource blocks frequency division multiplexed with the second set of resource blocks.

In some examples of the method, apparatuses, and non-transitory computer-readable medium described herein, the first set of time and frequency resources corresponds to a first antenna array configuration of the UE and the second set of time and frequency resources corresponds to a second antenna array configuration of the UE.

In some examples of the method, apparatuses, and non-transitory computer-readable medium described herein, the transmitting further may include operations, features, means, or instructions for determining a first activated beam index corresponding to the first beam based on the first resource indication value, and determining a second activated beam index corresponding to the second beam based on the second resource indication value.

In some examples of the method, apparatuses, and non-transitory computer-readable medium described herein, the first activated beam index may be included in a first set of beam indices configured by radio resource control and the second activated beam index may be included in a second set of beam indices, different from the first set of beam indices, and configured by radio resource control.

Some examples of the method, apparatuses, and non-transitory computer-readable medium described herein may further include operations, features, means, or instructions for identifying a last downlink control information of the first downlink control message and a last downlink control information of the second downlink control message, and where the determining further includes, determining the first resource indication value based on identifying the last downlink control information of the first downlink control message and determining the second resource indication value based on identifying the last downlink control information of the second downlink control message.

In some examples of the method, apparatuses, and non-transitory computer-readable medium described herein, the first resource indication value includes a first physical uplink control channel resource indication index value and the second index value includes a second physical uplink control channel resource indication index value.

DETAILED DESCRIPTION

A user equipment (UE) may establish communication with multiple transmission reception points (TRPs), such as a first TRP and a second TRP, in a wireless communications system (e.g., a multi-TRP environment). In some examples, a backhaul link between the TRPs may experience low data rates or constrained capacity (e.g., non-ideal links) and therefore reduce coordination capability in the wireless communications system.

For downlink transmission, the first TRP and second TRP may individually transmit physical downlink control channel (PDCCH) messages. The PDCCH messages may include downlink control information (DCI), such as a first DCI and a second DCI, respectively. The DCIs may each indicate a codeword for scheduling subsequent physical downlink control channel (PDSCH) transmissions from the first TRP or the second TRP. In addition, each of the first DCI and the second DCI may include scheduling information for UE reporting. The scheduling information may include timing indicator (e.g., K1) index values or physical uplink control channel (PUCCH) resource indicator (PRI) index values.

The UE may receive the PDCCH messages and process the first DCI and second DCI. The UE may determine indications in each of the DCIs, such as K1 or PRI index values. Based on the indications, the UE may differentiate the DCIs of the received PDCCH messages. For example, the UE may determine the first TRP is associated with the first DCI and the second TRP is associated with the second DCI. The UE may receive and decode the scheduled PDSCH transmissions from the first TRP and the second TRP, and use the index values to schedule PUCCH transmissions directed to the first TRP and the second TRP. The PUCCH transmission may carry uplink control information (UCI), including hybrid automatic repeat request (HARQ) payloads determined separately for each TRP. The UE may use the index values to schedule the HARQ payloads on PUCCH resources of a configured PUCCH resource set. The UE may also use the index values to identify activated beams for PUCCH transmission directed to the first TRP and PUCCH transmission directed to the second TRP.

Aspects of the disclosure are initially described in the context of a wireless communications system. Aspects of the disclosure are further illustrated by and described with reference to DCI differentiation, PUCCH scheduling, beam selection, and a process flow. Aspects of the disclosure are further illustrated by and described with reference to apparatus diagrams, system diagrams, and flowcharts that relate to PUCCH carrying HARQ-A for multi-TRP wireless communications systems with non-ideal backhaul coordination.

Figure 1:
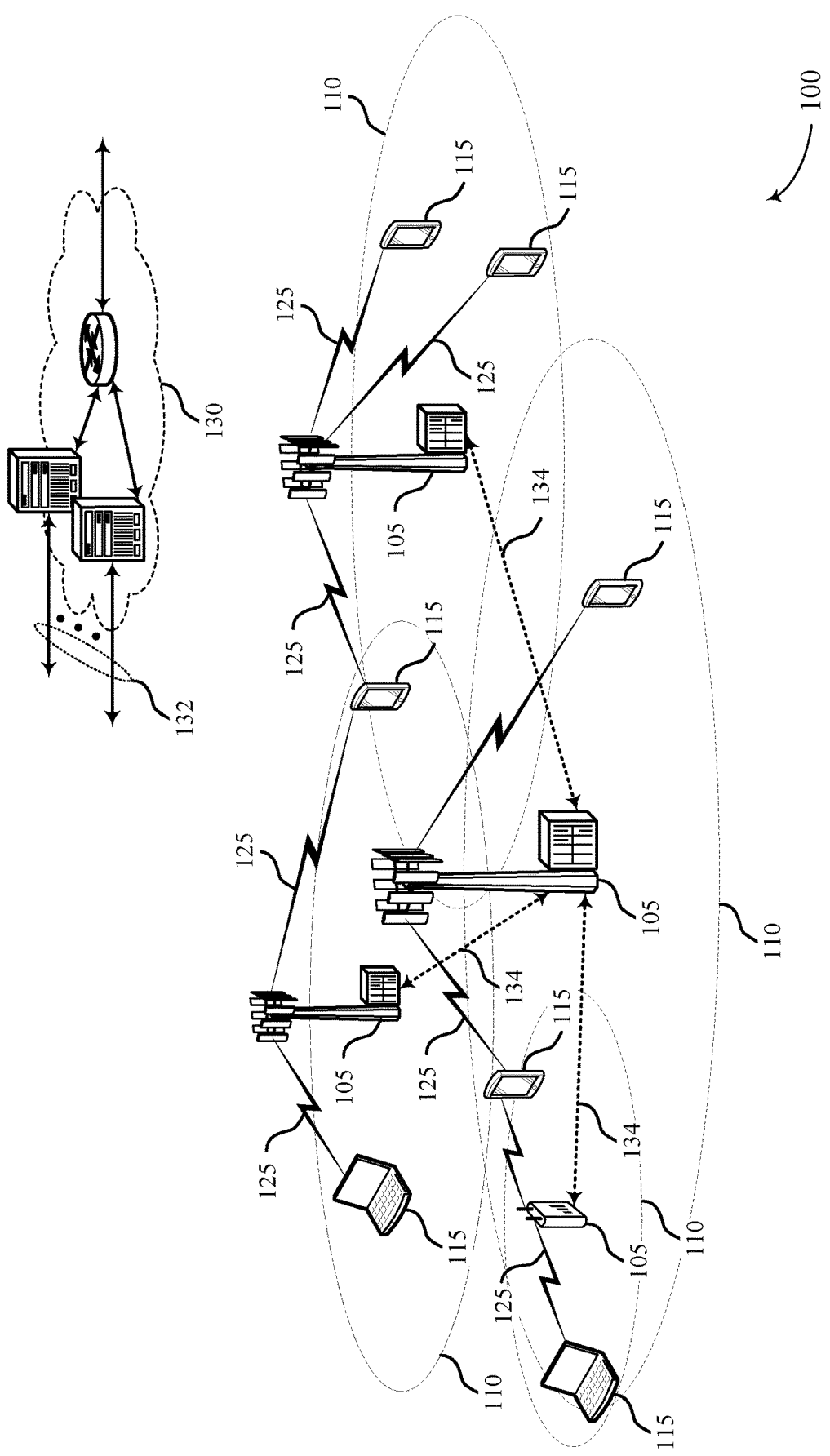
FIG. 1 illustrates an example of a wireless communications system that supports PUCCH carrying HARQ-A for multi-TRP with non-ideal backhaul in accordance with aspects of the present disclosure.

FIG. 1 illustrates an example of a wireless communications system 100 that supports PUCCH carrying HARQ-A for multi-TRP with non-ideal backhaul in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some examples, UEs 115 may be designed to support critical functions (e.g., mission critical functions), and a wireless communications system 100 may be configured to provide ultra-reliable communications for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support multiple communication links 125 between a UE 115 and base stations 105, also referred to herein as transmission reception points (TRPs). For example, wireless communications system 100 may include a first TRP 105 and a second TRP 105. The first TRP 105 and the second TRP 105 may coordinate via a backhaul link 134. The backhaul link may support enhanced network deployment and dense network integration across one or more supported coverage areas 110. In some examples, the backhaul link 134 may be referred to as an ideal backhaul link and satisfy one or more throughput or communication latency requirements (e.g., threshold values) associated with the wireless communications system 100. In other cases, the backhaul link 134 may experience low data rates or constrained capacity and fail to satisfy the one or more threshold values (i.e., a non-ideal backhaul link).

In the case of a non-ideal backhaul coordination on backhaul link 134, the first TRP 105 and the second TRP 105 may transmit separate PDCCH transmissions to the UE 115. Each of the PDCCH transmissions may include DCI for scheduling subsequent PDSCH transmission and include one or more indication values for formatting a PUCCH response at the UE 115. Based on the received PDCCH and PDSCH transmissions, the UE may schedule a PUCCH message that includes UCI directed to the TRPs 105. For example, the UE 115 may schedule a first PUCCH that includes a HARQ-A payload directed to the first TRP 105. Additionally or alternatively, the UE 115 may schedule a second PUCCH that includes a HARQ-A payload directed to the second TRP 105.

The first PUCCH and the second PUCCH may be included on PUCCH resources or PUCCH resource groups of a configured PUCCH resource set. The PUCCH resource set may be configured by RRC signaling and may correspond to one of multiple (e.g., 4) PUCCH resource set configurations. The configured PUCCH resource set may be based on a payload size of scheduled UCI by the UE 115. In some examples, a first set of the one or more PUCCH resource set may include up to 32 PUCCH resources, while additional sets of the one or more PUCCH resource sets may include up to 8 PUCCH resources. The RRC signaling may also indicate to the UE 115 which beam to use for transmitting the first PUCCH and which beam to use for transmitting the second PUCCH. For example, an indication (e.g., PUCCH-SpatialRelationInfo) may indicate a beam index (i.e., pointing to a beam associated with a SSB, CSI-RS, or SRS) for transmitting a PUCCH resource of the PUCCH resource set.

As described herein, the UE 115 may employ new techniques for differentiating the received DCI information received from the TRPs 105. The described aspects are also directed to determining which PUCCH of a set of PUCCHs is to be transmitted to each of the TRPs 105. The UE may schedule and/or differentiate between each PUCCH in the set of PUCCHs via the scheduling information in the DCI. In some examples, the UE may schedule and/or differentiate between the PUCCHs based on the included indicator index values of the received DCI of the PDCCH messages. The PUCCH responses from UE 115 to each TRP 105 may be transmitted in different slots, different subframes, or simultaneously across resources of an uplink grant.

Figure 2:
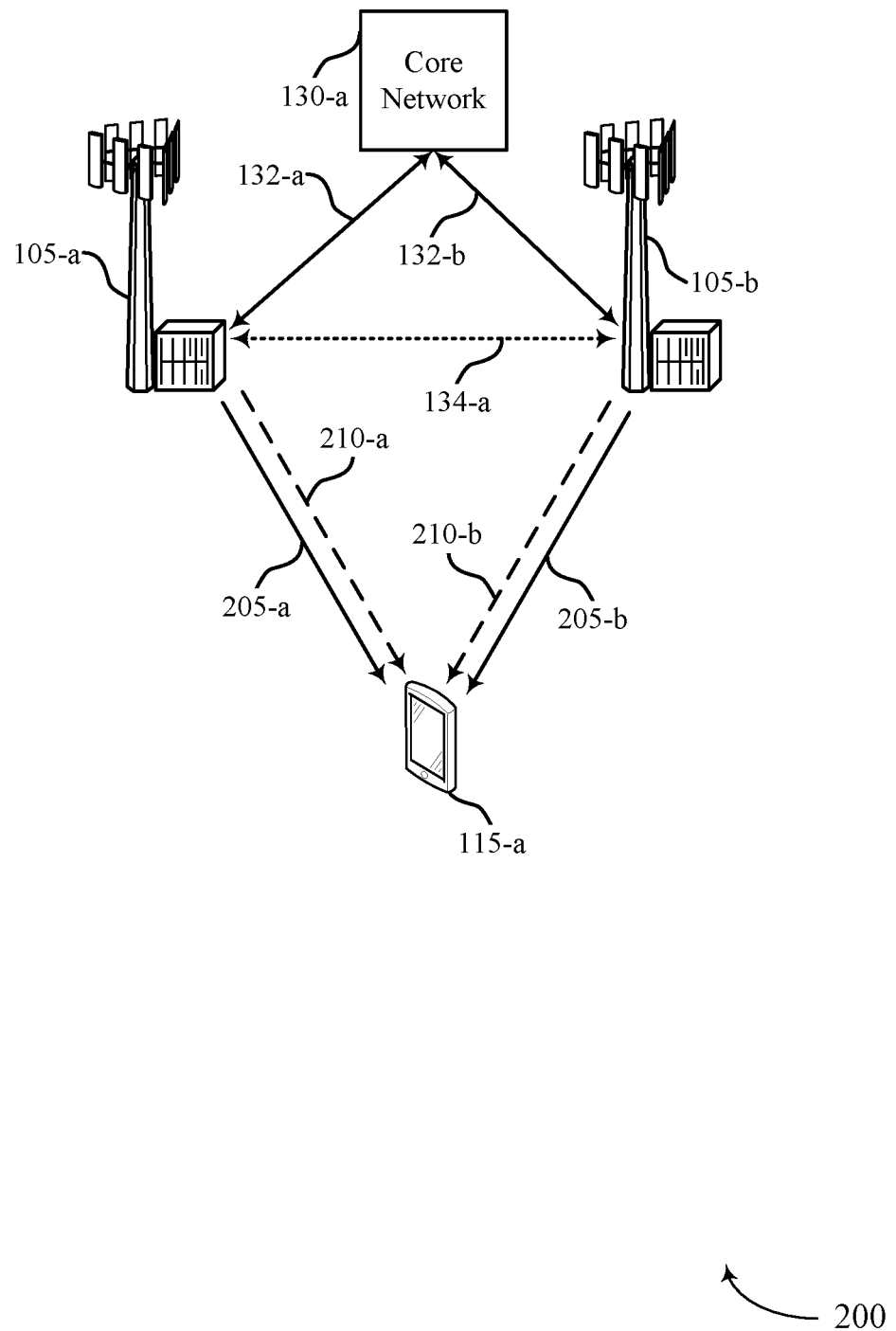
FIG. 2 illustrates an example of a wireless communications system that supports PUCCH carrying HARQ-A for multi-TRP with non-ideal backhaul in accordance with aspects of the present disclosure.

FIG. 2 illustrates an example of a wireless communications system 200 that supports PUCCH carrying HARQ-A for multi-TRP with non-ideal backhaul in accordance with aspects of the present disclosure. Wireless communications system 200 may include a first TRP 105-a, a second TRP 105-b, and a UE 115-a, which may be examples of the corresponding devices described with reference to FIG. 1. Each of the TRPs 105-a and 105-b may support one or more backhaul connections 132 for communicating with a core network 130-a. TRP 105-a and TRP 105-b may support coordinated communication with each other via a backhaul link 134-a. As described, UE 115-a may have multiple concurrent connections with each TRP 105, as part of a multi-TRP environment.

In some examples, the backhaul link 134-a may provide an ideal backhaul that supports close coordination between the TRP 105-a and the TRP 105-b. In other cases, backhaul link 134-a may have a relatively low data rate, or a relatively constrained capacity which may result in a non-ideal backhaul connection over the backhaul link 134-a. In other cases, backhaul link 134-a may not be present and the first TRP 105-a and the second TRP 105-b may communicate via the core network 130-a and respective backhaul links 132 with the core network 130-a.

The UE 115-a may establish connections with the TRPs 105, and as part of the connection establishments, or following the connection establishments, may identify a reporting configuration for uplink transmissions of the UE 115-a. In some examples, a number of different reporting configurations may be available for transmitting uplink signaling at the UE 115-a. Such reporting configurations may include, for example, reporting configurations for use in cases where ideal backhaul is present, and other reporting configurations for use in cases where non-ideal backhaul is present. In some examples, the number of different reporting configurations may be signaled to the UE 115-a, or may be predetermined and known by the UE 115-a and the TRPs 105 (e.g., according to a NR specification).

In the case of a non-ideal (or no) backhaul coordination on backhaul link 134-a, the TRPs 105 may each transmit separate PDCCH transmissions 205 to the UE 115-a. For example, the TRP 105-a may transmit a PDCCH message 205-a containing DCI. The DCI may schedule a codeword for subsequent PDSCH transmission 210-a on configured spatial streams (e.g., via configured demodulation reference signal (DMRS) ports). For example, The DCI may contain a transmission configuration indication (TCI) state field indicting a quasi-co-location (QCL) relationship for TRP 105-a to effectively indicate the corresponding PDSCH beam and transmit the PDSCH message 210-a. Similarly, the TRP 105-b may transmit a PDCCH message 205-b containing DCI. The DCI may schedule a codeword and contain a TCI state field indication for TRP 105-b to transmit a subsequent PDSCH message 210-b.

The UE 115-a may receive the PDCCH messages 205, process, and decode the included DCI. In some examples, the DCI included in each of PDCCH messages 205-a and 205-b may be formatted to include scheduling information for subsequent PUCCH response at the UE 115. For example, the DCIs may each include a feedback timing indicator (e.g., a PDSCH-to-HARQ feedback timing indicator) index value, herein referred to as a K1 index value. The K1 index value may point to a resource index (e.g., a slot in the PUCCH message) for scheduling UCI directed to the TRP 105-a or TRP 105-b. In some examples, the feedback timing indicator index value may select a RRC configured set, or a default set (e.g., {1, 2, 3, 4, 5, 6, 7, 8}). Additionally or alternatively, the DCIs may each include a PUCCH resource indicator (PRI) index value. The PRI index value may point to a resource included in a resource set of the PUCCH.

Based on the received DCI of PDCCH messages 205-a and 205-b, the UE 115-a may identify the included index values (e.g., the K1 index value, the PRI index value, etc.) and differentiate the DCI of the PDCCH messages 205. For example, in some examples, the UE 115-a may evaluate the index values included in the DCI of PDCCH message 205-a and determine the DCI of PDCCH message 205-a is associated with TRP 105-a. In other cases, the UE 115-a may evaluate the index values included in the DCI of PDCCH message 205-b and determine the DCI of PDCCH message 205-b is associated with TRP 105-b.

Following the DCI differentiation, the UE 115-a may schedule PUCCH transmissions (such as a first PUCCH and a second PUCCH) that includes UCI determined for TRP 105-a and UCI determined for TRP 105-b. For example, the UE 115-a may schedule a first PUCCH that includes a HARQ-A payload directed to the TRP 105-a and based on the received PDSCH message 210-a. Additionally or alternatively, the UE 115 may schedule a second PUCCH that includes a HARQ-A payload directed to the second TRP 105. The first PUCCH and the second PUCCH may be included on a PUCCH resources or a PUCCH resource group of a configured PUCCH resource set.

An RRC configuration of the PUCCH resource set may indicate to the UE 115-a an activated beam for transmitting the first PUCCH directed to TRP 105-a, and an activated beam for transmitting the second PUCCH directed to TRP 105-b. For example, in some examples, an indication value (e.g., PUCCH-SpatialRelationInfo) of the RRC configuration may indicate a beam index (i.e., pointing to a beam associated with a SSB, CSI-RS, or SRS) for a transmitting a PUCCH resource of the PUCCH resource set. A MAC-CE may activate the beam index from a set of configured indices. In other cases, a PUCCH resource may be associated with multiple indication values (e.g., PUCCH-SpatialRelationInfo). The UE 115-a may determine the activated beam for transmitting the PUCCH based on the included index values of the received DCI (e.g., PRI index values of the DCI). The UE 115 may then transmit the PUCCH message, including the first PUCCH and the second PUCCH on the associated beams, as activated.

Figure 3:
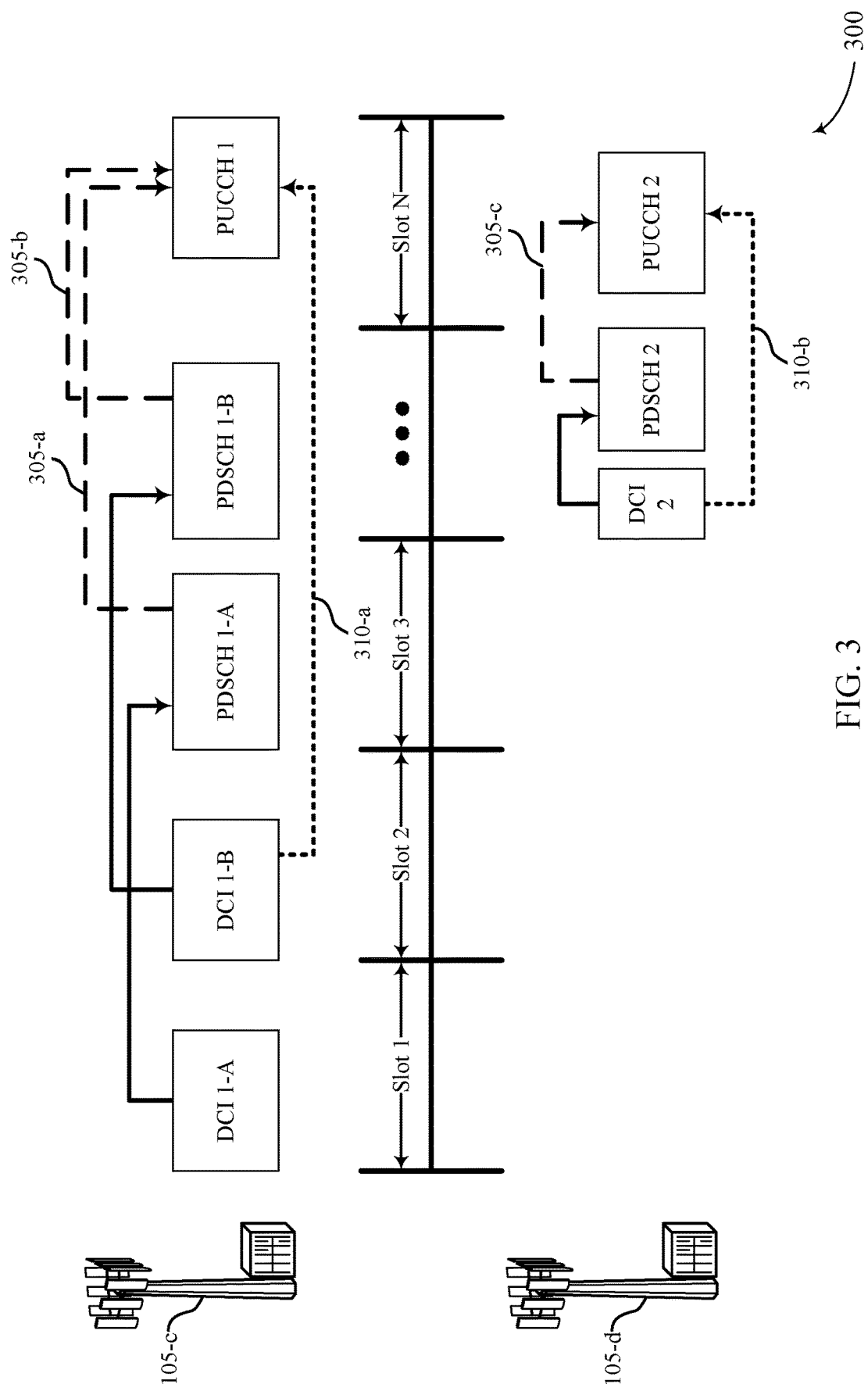
FIG. 3 illustrates an example of a transmission scheme that supports PUCCH carrying HARQ-A for multi-TRP with non-ideal backhaul in accordance with aspects of the present disclosure.

As described, a UE (e.g., a UE 115) may implement one or more methods for differentiating DCI included in one or more received PDCCH messages of a multi-TRP transmission scheme, with reference to FIGS. 1 and 2. Following the DCI differentiation, the UE 115 may schedule a PUCCH message transmission that includes UCI, such as HARQ-A payloads, determined for one or more TRPs 105. For example, FIG. 3 illustrates a transmission scheme 300 that supports PUCCH carrying HARQ-A for multi-TRP with non-ideal backhaul in accordance with aspects of the present disclosure. Transmission scheme 300 may be implemented by a UE that supports multiple concurrent connections with associated TRPs 105-c and 105-d, as described with reference to FIGS. 1 and 2.

The TRPs 105-*c* and 105-*d* may each transmit separate PDCCH transmissions containing one or more DCI payloads (e.g., DCI 1-A, DCI 1-B, DCI 2, etc.). For example, TRP 105-*c* may transmit a PDCCH message including a DCI 1-A in a first slot and a DCI 1-B in a second slot. In other examples, TRP 105-*d* may transmit a PDCCH message including a DCI 2 in a subsequent slot (i.e., slot N-1). DCI 1-A may schedule a first PDSCH transmission (e.g., PDSCH 1-A) of TRP 105-*c*, and DCI 1-B may schedule a second PDSCH transmission (e.g., PDSCH 1-B) of TRP 105-*c*. DCI 2 may schedule a PDSCH transmission (PDSCH 2) of TRP 105-*d*.

The UE may receive the one or more DCI payloads DCI 1-A, DCI 1-B, DCI 2, and identify the included scheduling information for subsequent PUCCH response at the UE. For example, the DCIs 1-A, 1-B, and 2 may each include one or more feedback timing indicator index values, including a DCI-to-PDSCH (e.g., K0) index value and a PDSCH-to-HARQ (K1) index value 305. The K1 index values (e.g., K1 305-*a*, 305-*b*, and 305-*c*) may each point to a time resource index (e.g., a slot in the PUCCH message) for scheduling PUCCH transmission directed to the TRP 105-*c* or TRP 105-*d*. Additionally or alternatively, the DCIs 1-A, 1-B, and 2 may each include a PUCCH resource indicator (PRI) index value 310. The PRI index value (e.g., PRI 310-*a* or 310-*b*) may point to a resource included in a configured PUCCH resource set.

In some examples, the UE may differentiate the DCIs 1-A, 1-B, and 2 based on the included K1 index values 305. The UE may then determine scheduling for the PUCCH transmissions directed to TRP 105-*c* and TRP 105-*d* on resources of the PUCCH resource set. The scheduling may be based on the one or more included K1 index values 305 of the DCIs 1-A, 1-B, and 2, as well as the configuration of the PUCCH resource set.

In a first example, TRP 105-*c* and TRP 105-*d* may support semi-static coordination and agree on resource splitting for scheduling PUCCH transmissions at the UE. The resource splitting may include a first set of time resources for PUCCH transmission directed to TRP 105-*c* and a second set of time resources for PUCCH transmission directed to TRP 105-*d*, in the PUCCH resource set. The first set of time resources and the second set of time resources may be disjoint sets. The sets of time resources may correspond to slots in the PUCCH resource set, or one or more symbols in a slot of the PUCCH resource set. For example, the first set of slots may include one or more slots of even indices (e.g., 2, 4, 6, etc.) in the PUCCH resource set and the second set of slots may include one or more interleaved slots of odd indices (e.g., 1, 3, 5, etc.). Based on the resource splitting, the TRP 105-*c* and the TRP 105-*d* may be constrained to a reduced number of K1 index values for indication in DCI. In some examples, the set of possible K1 index values for each TRP may be the same, partially different, or completely different based on when the PDCCH messages are transmitted to the UE.

The UE may receive RRC signaling from at least one of TRP 105-*c* or TRP 105-*d*. The RRC signaling may indicate the semi-static coordination between the TRPs 105, as well as the selected resource splitting for scheduling PUCCH transmissions on the configured PUCCH resource set. The UE may identify the K1 index value 305-*a* included in DCI 1-A maps to a temporal instance (e.g., a slot, or a symbol of a slot) that is configured for TRP 105-*c*. Based on the mapping, the UE may determine that DCI 1-A is associated with TRP 105-*c*. Similarly, the UE may identify the K1 index value 305-*c* included in DCI 2 maps to a temporal instance (e.g., a slot, or a symbol of a slot) that is configured for TRP 105-*d*. Based on the mapping, the UE may determine that DCI 2 is associated with TRP 105-*d*.

In addition, based on the identified K1 index values 305, the UE may then determine a scheduling for PUCCH 1 transmission directed to TRP 105-*c* and PUCCH 2 transmission directed to TRP 105-*d*. For example, the K1 index value 305-*a* of DCI 1-A may indicate a first temporal instance (e.g., a slot, or a symbol of a slot) for scheduling the PUCCH 1 transmission. In other examples, the K1 index value 305-*c* of DCI 2 may indicate a second temporal instance (e.g., a slot, or a symbol of a slot) for scheduling the PUCCH 2 transmission.

The UE may determine an activated beam (e.g., SpatialRelationInfo1) associated with PUCCH resources for transmitting the PUCCH transmission 1 directed to TRP 105-*c*. The PUCCH transmission 1 may contain a UCI payload, including a HARQ-A payload response for the data contents of PDSCH 1-A. Additionally or alternatively, the UE may determine an activated beam (e.g., SpatialRelationInfo2) associated with PUCCH resources for transmitting the PUCCH transmission 2 directed to TRP 105-*d*. The PUCCH transmission 2 may contain a UCI payload, including a HARQ-A payload response for the data contents of PDSCH 2.

In a second example, the UE may differentiate the DCIs 1-A, 1-B, and 2 based on explicit or implicit indication included in each of the respective DCIs. For example, the UE may identify an explicit or implicit indication in DCI 1-A, and determine DCI 1-A is associated with TRP 105-*c*. Similarly, the UE may identify an explicit or implicit indication in DCI 2, and determine DCI 2 is associated with TRP 105-*d*.

In addition, the UE may identify the K1 index values 305 included in the DCIs 1-A, 1-B, and 2, and determine a scheduling for PUCCH transmission directed to each of the TRPs 105. For example, the K1 index value 305-*a* of DCI 1-A may indicate a first temporal instance (e.g., a slot, or a symbol of a slot) for scheduling the PUCCH 1 transmission. In other examples, the K1 index value 305-*c* of DCI 2 may indicate a second temporal instance (e.g., a slot, or a symbol of a slot) for scheduling the PUCCH 2 transmission.

The UE may determine an activated beam (e.g., SpatialRelationInfo1) associated with PUCCH resources for transmitting the PUCCH 1 transmission directed to TRP 105-*c*. The PUCCH 1 transmission may contain a UCI payload, including a HARQ-A payload response for the data contents of PDSCH 1-A. Additionally or alternatively, the UE may determine an activated beam (e.g., SpatialRelationInfo2) associated with PUCCH resources for transmitting the PUCCH 2 transmission directed to TRP 105-*d*. The PUCCH 2 transmission may contain a UCI payload, including a HARQ-A payload response for the data contents of PDSCH 2.

Additionally or alternatively to the examples described above, PUCCH resources of the configured PUCCH resource set may be associated with multiple beams. As described, a PRI index value 310 of the DCI (e.g., DCI 1-A, DCI 1-B, or DCI 2) may indicate the PUCCH resource for scheduling PUCCH 1 or PUCCH 2 transmission. The UE may then determine the beam for performing the PUCCH 1 or PUCCH 2 transmission based on the configured resource splitting (e.g., via RRC configuration) or based on an explicit or implicit indication included in the DCI. By configuring the PUCCH resources to be associated with multiple beams, the UE may support transmission directed to TRP 105-*c* or TRP 105-*d* over the same PUCCH resources.

In some examples, the UE may differentiate the DCIs 1-A, 1-B, and 2 based on the included PRI index values 310. The UE may then determine scheduling for the PUCCH transmissions (e.g., PUCCH 1, PUCCH 2) directed to TRP 105-*c* and TRP 105-*d* on resources of the PUCCH resource set. The scheduling may be based on the PRI index value 310 of the last DCI signaled by the respective TRP 105, for a common K1 index value 305. For example, DCI 1-A and DCI 1-B of the PDCCH message transmitted by TRP 105-*c* may share a K1 index value 305 (i.e., K1 305-*a* may be equal to K1 305-*b*). Due to the order of DCI transmission, the PRI value 310-*a* may be indicated by DCI 1-B.

The configured PUCCH resource set may include a first PUCCH resource group and a second PUCCH resource group. Each PUCCH resource group may be associated with one of TRP 105-*c* or TRP 105-*d*, and may contain multiple PUCCH resources. The scheduling of the PUCCH 1 transmission and the PUCCH 2 transmission may include scheduling in different OFDM symbols of a slot, frequency division multiplexing in the same OFDM symbols, or simultaneous PUCCH transmission on different UE panels or antennae.

In a first example, the UE may identify the PRI index value 310-*a* included in DCI 1-B and evaluate the one or more bits contained in the PRI index value 310-*a*. A first bit of the PRI 310-*a* may determine a first PUCCH resource group associated with TRP 105-*c*. Similarly, a first bit of the PRI 310-*b* may determine a second PUCCH resource group associated with the TRP 105-*d*. Based on the determined first PUCCH resource group and second PUCCH resource group, the UE may determine DCIs 1-A and 1-B are associated with TRP 105-*c* and DCI 2 is association with TRP 105-*d*.

In addition, based on the identified PRI index values 310, the UE may then evaluate one or more additional bits included in the PRI index values 310. The one or more additional bits included in PRI index value 310-*a* may determine the PUCCH resources contained in the first PUCCH resource group. The one or more additional bits included in PRI index value 310-*b* may determine the PUCCH resources contained in the second PUCCH resource group. Based on the determined PUCCH resources, the UE may then determine a scheduling for PUCCH 1 transmission directed to TRP 105-*c* and PUCCH 2 transmission directed to TRP 105-*d*. For example, the PRI index value 310-*a* may indicate PUCCH resources of a first PUCCH resource group. In other examples, the PRI index value 310-*b* may indicate PUCCH resources of a second PUCCH resource group.

The UE may determine an activated beam (e.g., SpatialRelationInfo1) associated with PUCCH resources for transmitting the PUCCH transmission 1 directed to TRP 105-*c*. In some examples, the activated beam may correspond to the first PUCCH resource group. In other cases, the activated beam may correspond to a PUCCH resource included in the first PUCCH resource group. The PUCCH transmission 1 may contain a UCI payload, including a HARQ-A payload response for the data contents of PDSCH 1-A. Additionally or alternatively, the UE may determine an activated beam (e.g., SpatialRelationInfo2) associated with PUCCH resources for transmitting the PUCCH transmission 2 directed to TRP 105-*d*. In some examples, the activated beam may correspond to the second PUCCH resource group. In other cases, the activated beam may correspond to a PUCCH resource included in the second PUCCH resource group. The PUCCH transmission 2 may contain a UCI payload, including a HARQ-A payload response for the data contents of PDSCH 2.

In a second example, the UE may differentiate the DCIs 1-A, 1-B, and 2 based on explicit or implicit indication included in each of the respective DCIs. For example, the UE may identify an explicit or implicit indication in DCI 1-A or DCI 1-B, and determine DCI 1-A and DCI 1-B are associated with TRP 105-*c* Similarly, the UE may identify an explicit or implicit indication in DCI 2, and determine DCI 2 is associated with TRP 105-*d*.

In addition, the UE may determine the PUCCH resource group for the DCIs 1-A, 1-B, and 2 based on the differentiation. For example, the explicit or implicit indication included in DCI 1-A or 1-B may indicate a first PUCCH resource group associated with the TRP 105-*c*. In other examples, the explicit or implicit indication included in DCI 2 may indicate a second resource group associated with the TRP 105-*d*.

The UE may then evaluate the PRI index value 310-*a* included in the DCI 1-B and identify the PUCCH resources contained in the first PUCCH resource group. Similarly, the UE may evaluate the PRI index value 310-*b* included in the DCI 2 and identify the PUCCH resources contained in the second PUCCH resource group. Based on the identified PUCCH resources, the UE may then determine a scheduling for PUCCH 1 transmission directed to TRP 105-*c* and PUCCH 2 transmission directed to TRP 105-*d*. For example, the PRI index value 310-*a* may indicate PUCCH resources of a first PUCCH resource group for scheduling the PUCCH 1 transmission. In other examples, the PRI index value 310-*b* may indicate PUCCH resources of a second PUCCH resource group for scheduling the PUCCH 2 transmission.

The UE may determine an activated beam (e.g., SpatialRelationInfo1) associated with PUCCH resources for transmitting the PUCCH transmission 1 directed to TRP 105-*c*. In some examples, the activated beam may correspond to the first PUCCH resource group. In other cases, the activated beam may correspond to a PUCCH resource included in the first PUCCH resource group. The PUCCH transmission 1 may contain a UCI payload, including a HARQ-A payload response for the data contents of PDSCH 1-A. Additionally or alternatively, the UE may determine an activated beam (e.g., SpatialRelationInfo2) associated with PUCCH resources for transmitting the PUCCH transmission 2 directed to TRP 105-*d*. In some examples, the activated beam may correspond to the second PUCCH resource group. In other cases, the activated beam may correspond to a PUCCH resource included in the second PUCCH resource group. The PUCCH transmission 2 may contain a UCI payload, including a HARQ-A payload response for the data contents of PDSCH 2.

Figure 4:
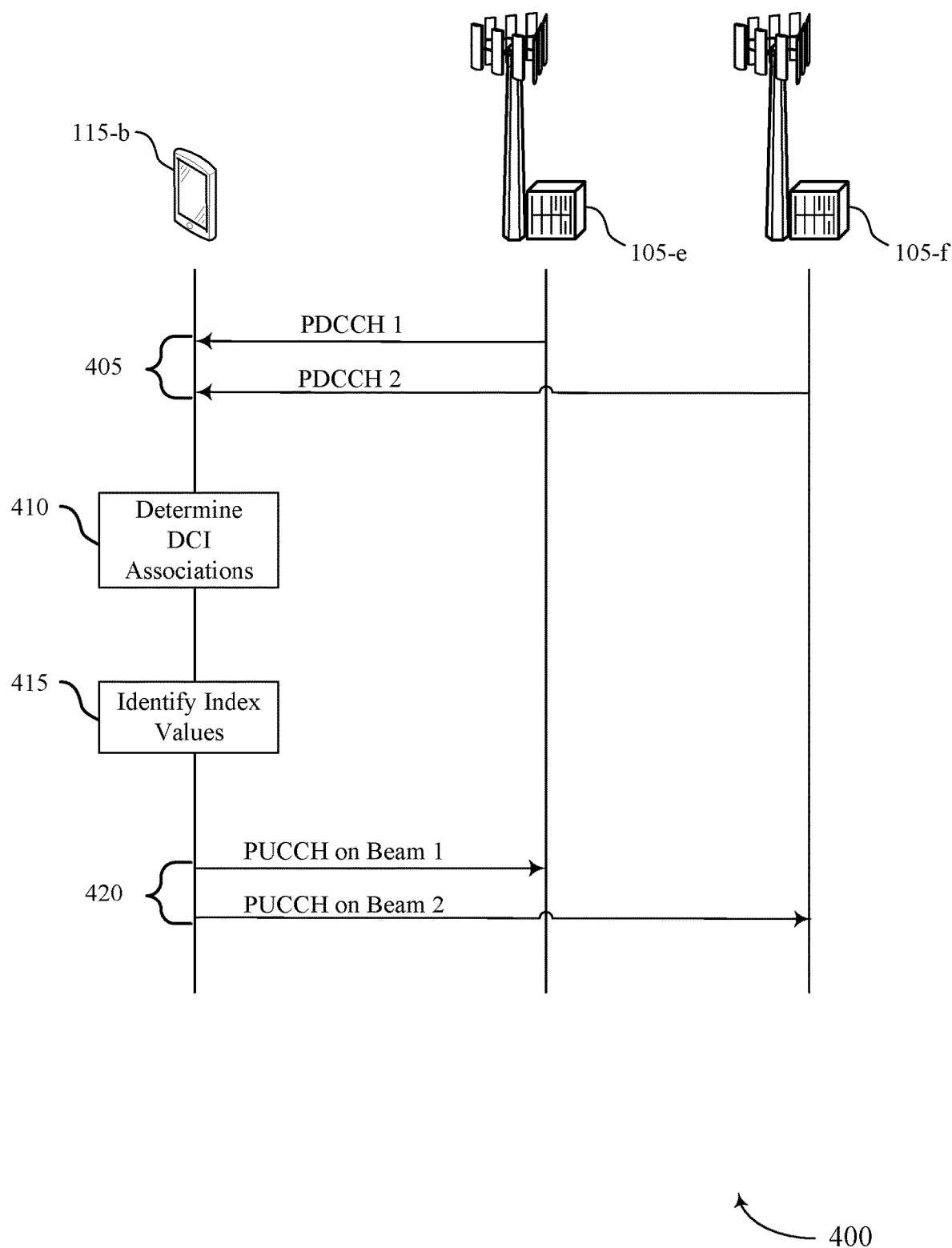
FIG. 4 illustrates an example of a process flow that supports PUCCH carrying HARQ-A for multi-TRP with non-ideal backhaul in accordance with aspects of the present disclosure.

FIG. 4 illustrates an example of a process flow 400 that supports PUCCH carrying HARQ-A for multi-TRP with non-ideal backhaul in accordance with aspects of the present disclosure. The process flow 400 may include a UE 115-*b*, a first TRP 105-*e*, and a second TRP 105-*f*, which may be examples of the corresponding devices described with reference to FIGS. 1-3. The UE 115-*b* may implement one or more methods for differentiating received DCI information from the TRPs 105 and scheduling a PUCCH transmission directed to TRP 105-*e* and TRP 105-*f*, as discussed herein. Alternative examples of the following may be implemented, where some steps are performed in a different order than described or are not performed at all. In some examples, steps may include additional features not mentioned below, or further steps may be added.

At 405, the UE 115-*b* may receive a first downlink control message (e.g., PDCCH 1) from TRP 105-*e* and a second downlink control message (e.g., PDCCH 2) from TRP 105-*f*.

PDCCH 1 and PDCCH 2 may each carry scheduling information. For example, PDCCH 1 may include a DCI payload that schedules subsequent PDSCH transmission by TRP 105-*e*. In other examples, PDCCH 2 may include a DCI payload that schedules subsequent PDSCH transmission by TRP 105-*f*. The DCIs may each include a feedback timing indicator (e.g., a PDSCH-to-HARQ feedback timing indicator) index value, herein referred to as a K1 index value. In some examples, the feedback timing indicator index value may select an RRC configured set, or a default set (e.g., {1, 2, 3, 4, 5, 6, 7, 8}). Additionally or alternatively, the DCIs may each include a PUCCH resource indicator (PRI) index value.

At 410, the UE 115-*b* may differentiate the DCI included on the received downlink control messages (e.g., PDCCH 1 and PDCCH 2). In some examples, the UE 115-*b* may receive RRC signaling from at least one of TRP 105-*e* or TRP 105-*f*. The RRC signaling may indicate the semi-static coordination between the TRPs 105, as well as the selected resource splitting for scheduling PUCCH transmissions on a configured PUCCH resource set. For example, the UE 115-*b* may determine, based on receiving PDCCH1, that the included DCI payload is associated with TRP 105-*e*. In other examples, the UE 115-*b* may determine, based on receiving PDCCH2, that the included DCI payload is associated with TRP 105-*f*. In other cases, the UE may differentiate the DCIs carried on PDCCH 1 and PDCCH 2 based on explicit or implicit indication included in each of the respective DCIs. For example, the UE may identify an explicit or implicit indication in the DCI payload of PDCCH 1, and determine the DCI is associated with TRP 105-*e*. In other examples, the UE may identify an explicit or implicit indication in the DCI payload of PDCCH 2, and determine the DCI is associated with TRP 105-*f*.

At 415, the UE 115-*b* may identify a feedback timing indicator (e.g., K1) index value included in the DCI of PDCCH 1. The UE 115-*b* may determine the K1 index value maps to a temporal instance of a PUCCH resource set, and is configured for TRP 105-*e*. Similarly, the UE 115-*b* may identify the K1 index value included in the DCI of PDCCH 2. The UE 115-*b* may determine the K1 index value maps to a temporal instance of the PUCCH resource set, and is configured for TRP 105-*f*.

In addition, based on the identified K1 index values of the differentiated DCI payloads, the UE may then determine a scheduling for PUCCH 1 transmission directed to TRP 105-*e* and PUCCH 2 transmission directed to TRP 105-*f*. For example, the K1 index value of the DCI included in PDCCH 1 may indicate a first temporal instance (e.g., a slot, or a symbol of a slot) for scheduling the PUCCH 1 transmission. In other examples, the K1 index value of the DCI included in PDCCH 2 may indicate a second temporal instance (e.g., a slot, or a symbol of a slot) for scheduling the PUCCH 2 transmission.

At 420, The UE may determine an activated beam (e.g., SpatialRelationInfo1) associated with PUCCH resources for transmitting the PUCCH transmission 1 directed to TRP 105-*e*. The PUCCH transmission 1 may contain a UCI payload, including a HARQ-A payload response. Additionally or alternatively, the UE may determine an activated beam (e.g., SpatialRelationInfo2) associated with PUCCH resources for transmitting the PUCCH transmission 2 directed to TRP 105-*f*. The PUCCH transmission 2 may contain a UCI payload, including a HARQ-A payload response.

Figure 5:
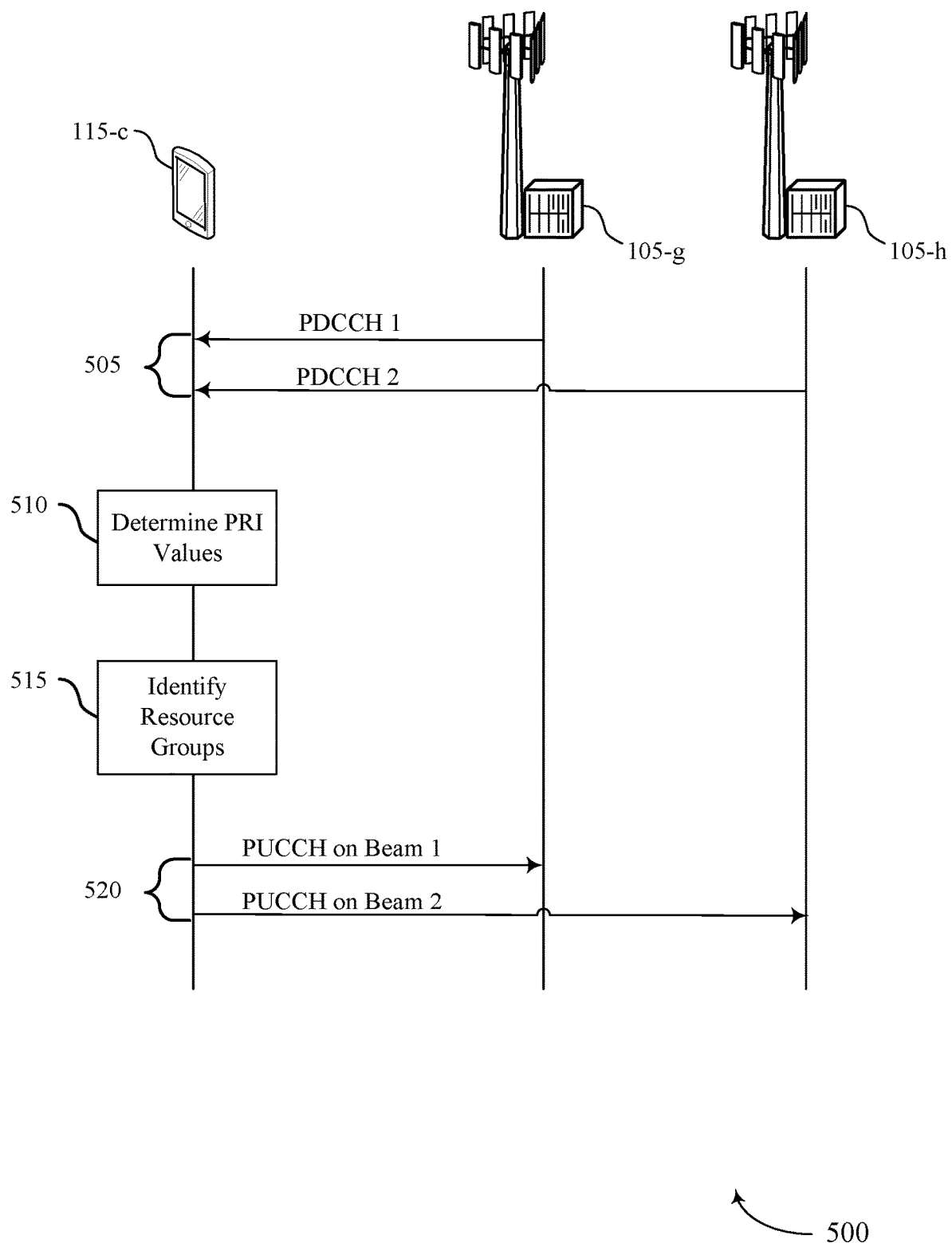
FIG. 5 illustrates an example of a process flow that supports PUCCH carrying HARQ-A for multi-TRP with non-ideal backhaul in accordance with aspects of the present disclosure.

FIG. 5 illustrates an example of a process flow 500 that supports PUCCH carrying HARQ-A for multi-TRP with non-ideal backhaul in accordance with aspects of the present disclosure. The process flow 500 may include a UE 115-*c*, a first TRP 105-*g*, and a second TRP 105-*h*, which may be examples of the corresponding devices described with reference to FIGS. 1-4. The UE 115-*c* may implement one or more methods for differentiating received DCI information and scheduling a PUCCH transmission directed to TRP 105-*g* and TRP 105-*h*, as discussed herein. Alternative examples of the following may be implemented, where some steps are performed in a different order than described or are not performed at all. In some examples, steps may include additional features not mentioned below, or further steps may be added.

At 505, the UE 115-*c* may receive a first downlink control message (e.g., PDCCH 1) from TRP 105-*g* and a second downlink control message (e.g., PDCCH 2) from TRP 105-*h*. PDCCH 1 and PDCCH 2 may each carry scheduling information. For example, PDCCH 1 may include a DCI payload that schedules subsequent PDSCH transmission by TRP 105-*g*. In other examples, PDCCH 2 may include a DCI payload that schedules subsequent PDSCH transmission by TRP 105-*h*. The DCIs may each include a PUCCH resource indicator (PRI) index value. The PRI index values may point to resources included in a configured PUCCH resource set.

At 510, the UE 115-*c* may identify the PRI index value included in the DCI payload of PDCCH 1, and evaluate the one or more bits contained in the PRI index value. A first bit of the PRI index value may determine a first PUCCH resource group associated with TRP 105-*g*. Similarly, the UE 115-*c* may identify the PRI index value included in the DCI payload of PDCCH 2, and evaluate the one or more bits contained in the PRI index value. A first bit of the PRI index value may determine a second PUCCH resource group associated with the TRP 105-*h*. Based on the determined first PUCCH resource group and second PUCCH resource group, the UE 115-*c* may differentiate the DCIs.

At 515, the UE-c may then evaluate one or more additional bits included in the PRI index values for the respective DCI payloads. For example, one or more additional bits included in PRI index value associated with TRP 105-*g* may indicate the PUCCH resources contained in the first PUCCH resource group. In other examples, one or more additional bits included in PRI index value associated with TRP 105-*h* may indicate the PUCCH resources contained in the second PUCCH resource group.

In addition, following determining the PUCCH resource groups, the UE 115-*c* may determine a scheduling for PUCCH 1 transmission directed to TRP 105-*g* and PUCCH 2 transmission directed to TRP 105-*f*. At 520, The UE may determine an activated beam (e.g., SpatialRelationInfo1) associated with the first PUCCH resource group. The UE 115-*c* may then transmit the PUCCH 1 transmission via the activated beam. The PUCCH transmission 1 may contain a UCI payload, including a HARQ-A payload response. Additionally or alternatively, the UE 115-*c* may determine an activated beam (e.g., SpatialRelationInfo2) associated with the second PUCCH resource group. The UE 115-*c* may then transmit the PUCCH 2 transmission via the activated beam.

Figure 6:
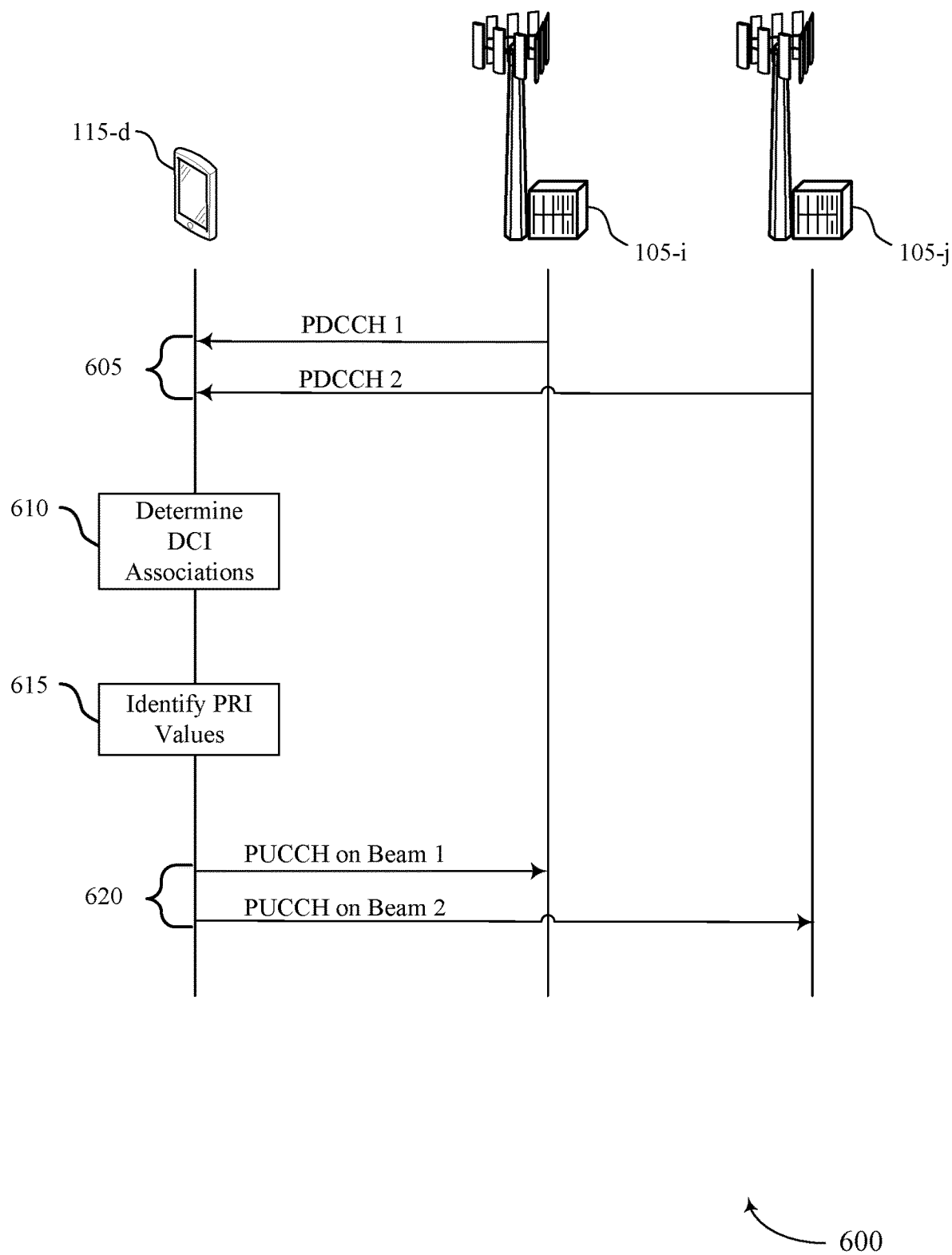
FIG. 6 illustrates an example of a process flow that supports PUCCH carrying HARQ-A for multi-TRP with non-ideal backhaul in accordance with aspects of the present disclosure.

FIG. 6 illustrates an example of a process flow 600 that supports PUCCH carrying HARQ-A for multi-TRP with non-ideal backhaul in accordance with aspects of the present disclosure. The process flow 600 may include a UE 115-*d*, a first TRP 105-*i*, and a second TRP 105-*j*, which may be examples of the corresponding devices described with reference to FIGS. 1-5. The UE 115-*d* may implement one or more methods for differentiating received DCI information and scheduling a PUCCH transmission directed to TRP 105-*i* and TRP 105-*j*, as discussed herein. Alternative examples of the following may be implemented, where some steps are performed in a different order than described or are not performed at all. In some examples, steps may include additional features not mentioned below, or further steps may be added.

At 605, the UE 115-*d* may receive a first downlink control message (e.g., PDCCH 1) from TRP 105-*i* and a second downlink control message (e.g., PDCCH 2) from TRP 105-*j*. PDCCH 1 and PDCCH 2 may each carry scheduling information. For example, PDCCH 1 may include a DCI payload that schedules subsequent PDSCH transmission by TRP 105-*i*. In other examples, PDCCH 2 may include a DCI payload that schedules subsequent PDSCH transmission by TRP 105-*j*. The DCIs may each include a PUCCH resource indicator (PRI) index value. Additionally, the DCIs may each include one or more explicit or implicit indications for TRP association.

At 610, the UE 115-*d* may differentiate the DCI payloads of PDCCH 1 and PDCCH 2 based on the explicit or implicit indications. For example, the UE 115-*d* may identify an explicit or implicit indication in a DCI payload of PDCCH 1, and determine the DCI is associated with TRP 105-*i*. Similarly, the UE may identify an explicit or implicit indication in a DCI payload of PDCCH2, and determine the DCI is associated with TRP 105-*j*. In addition, the UE may determine the PUCCH resource group for the based on the differentiation. For example, the explicit or implicit indication included in the DCI of PDCCH 1 indicate a first PUCCH resource group associated with the TRP 105-*i*. In other examples, the explicit or implicit indication included in the DCI of PDCCH 2 may indicate a second resource group associated with the TRP 105-*j*.

At 615, The UE may then evaluate the PRI index value included in the DCI of PDCCH 1, and determine the PUCCH resources contained in the first PUCCH resource group. Similarly, the UE may evaluate the PRI index value included in the DCI of PDCCH 2, and determine the PUCCH resources contained in the second PUCCH resource group. Based on the determined PUCCH resource groups and PUCCH resources contained in the PUCCH resource groups, the UE may then determine a scheduling for PUCCH 1 transmission directed to TRP 105-*i* and PUCCH 2 transmission directed to TRP 105-*j*.

At 620, The UE may determine an activated beam (e.g., SpatialRelationInfo1) associated with the first PUCCH resource group. The UE 115-*d* may then transmit the PUCCH 1 transmission via the activated beam. The PUCCH transmission 1 may contain a UCI payload, including a HARQ-A payload response. Additionally or alternatively, the UE 115-*d* may determine an activated beam (e.g., SpatialRelationInfo2) associated with the second PUCCH resource group. The UE 115-*d* may then transmit the PUCCH 2 transmission via the activated beam.

Figure 7:
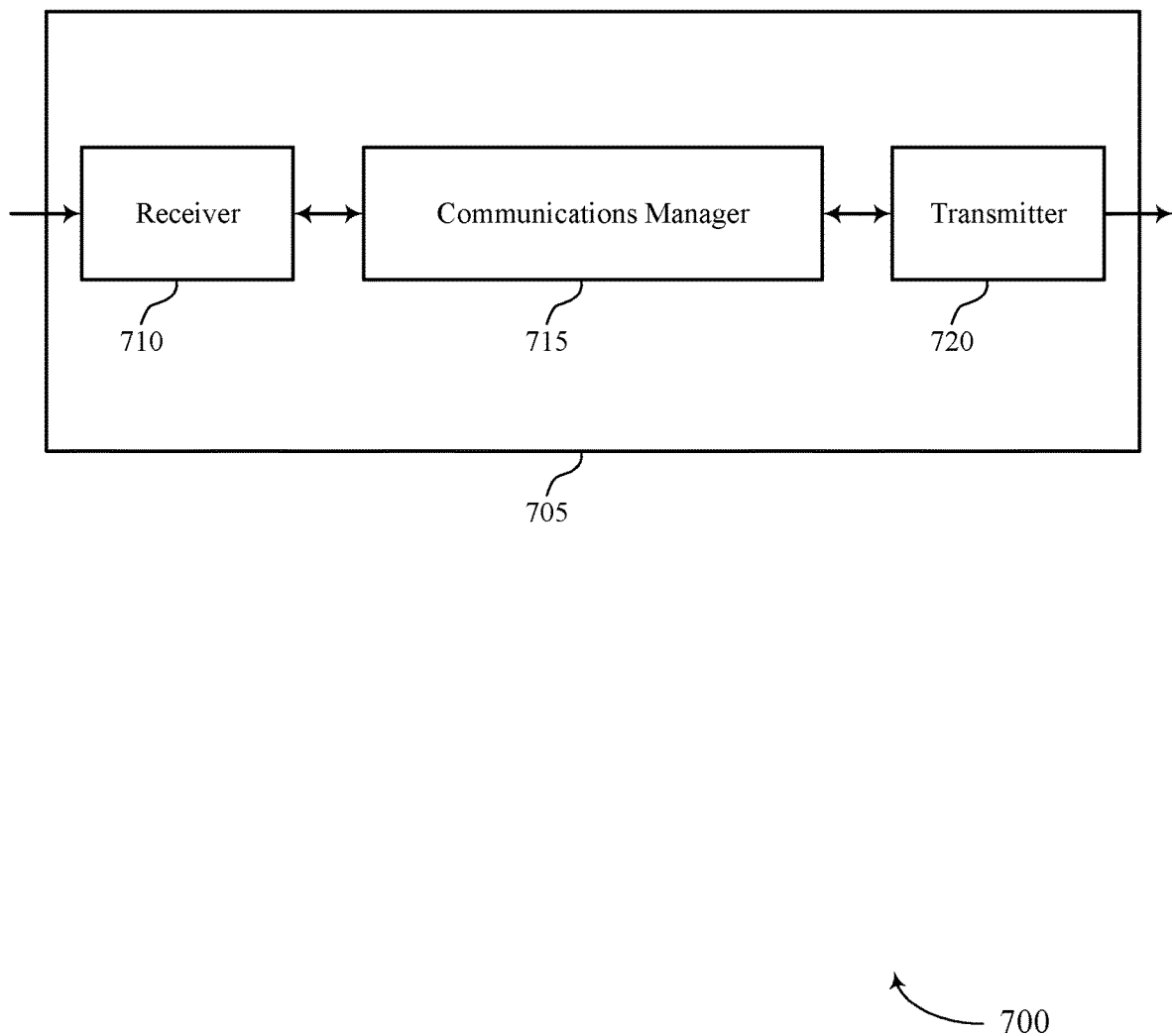
FIGS. 7 and 8 show block diagrams of devices that support PUCCH carrying HARQ-A for multi-TRP with non-ideal backhaul in accordance with aspects of the present disclosure.

FIG. 7 shows a block diagram 700 of a device 705 that supports PUCCH carrying HARQ-A for multi-TRP with non-ideal backhaul in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to PUCCH carrying HARQ-A for multi-TRP with non-ideal backhaul, etc.). Information may be passed on to other components of the device 705. The receiver 710 may be an example of aspects of the transceiver 1020 described with reference to FIG. 10. The receiver 710 may utilize a single antenna or a set of antennas.

In some examples, the communications manager 715 may receive a first downlink control message from a first transmission reception point and a second downlink control message from a second transmission reception point, determine, based on the receiving, that downlink control information of the first downlink control message is associated with the first transmission reception point and that downlink control information of the second downlink control message is associated with the second transmission reception point, identify a first index value in the downlink control information of the first downlink control message and a second index value in the downlink control information of the second downlink control message, and transmit, based on the first index value and the second index value, a first uplink control message and a second uplink control message.

In some examples, the communications manager 715 may receive a first downlink control message from a first transmission reception point and a second downlink control message from a second transmission reception point, determine, based on the receiving, that downlink control information of the first downlink control message includes a first resource indication value for the first transmission reception point and that downlink control information of the second downlink control message includes a second resource indication value for the second transmission reception point, identify a first resource group associated with the first resource indication value and a second resource group associated with the second resource indication value, and transmit, based on the first resource group and the second resource group, an uplink control message to the first transmission reception point on a first beam and the uplink control message to the second transmission reception point on a second beam.

In some examples, the communications manager 715 may receive a first downlink control message from a first transmission reception point and a second downlink control message from a second transmission reception point, determine, based on the receiving, downlink control information of the first downlink control message is associated with the first transmission reception point and downlink control information of the second downlink control message is associated with the second transmission reception point, identify that downlink control information of the first downlink control message includes a first resource indication value and that downlink control information of the second downlink control message includes a second resource indication value, and transmit, based on the first resource indication value and the second resource indication value, a first uplink control message to the first transmission reception point on a first beam and the second uplink control message to the second transmission reception point on a second beam. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The actions preformed by the communications manager 715 as described herein may be implemented to realize one or more potential advantages. One implementation may allow a base station 105 to increase data rates in the event of a non-ideal backhaul link. Additionally or alternatively, the base station 105 may further increase coordination capability in the event of a non-ideal backhaul link.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
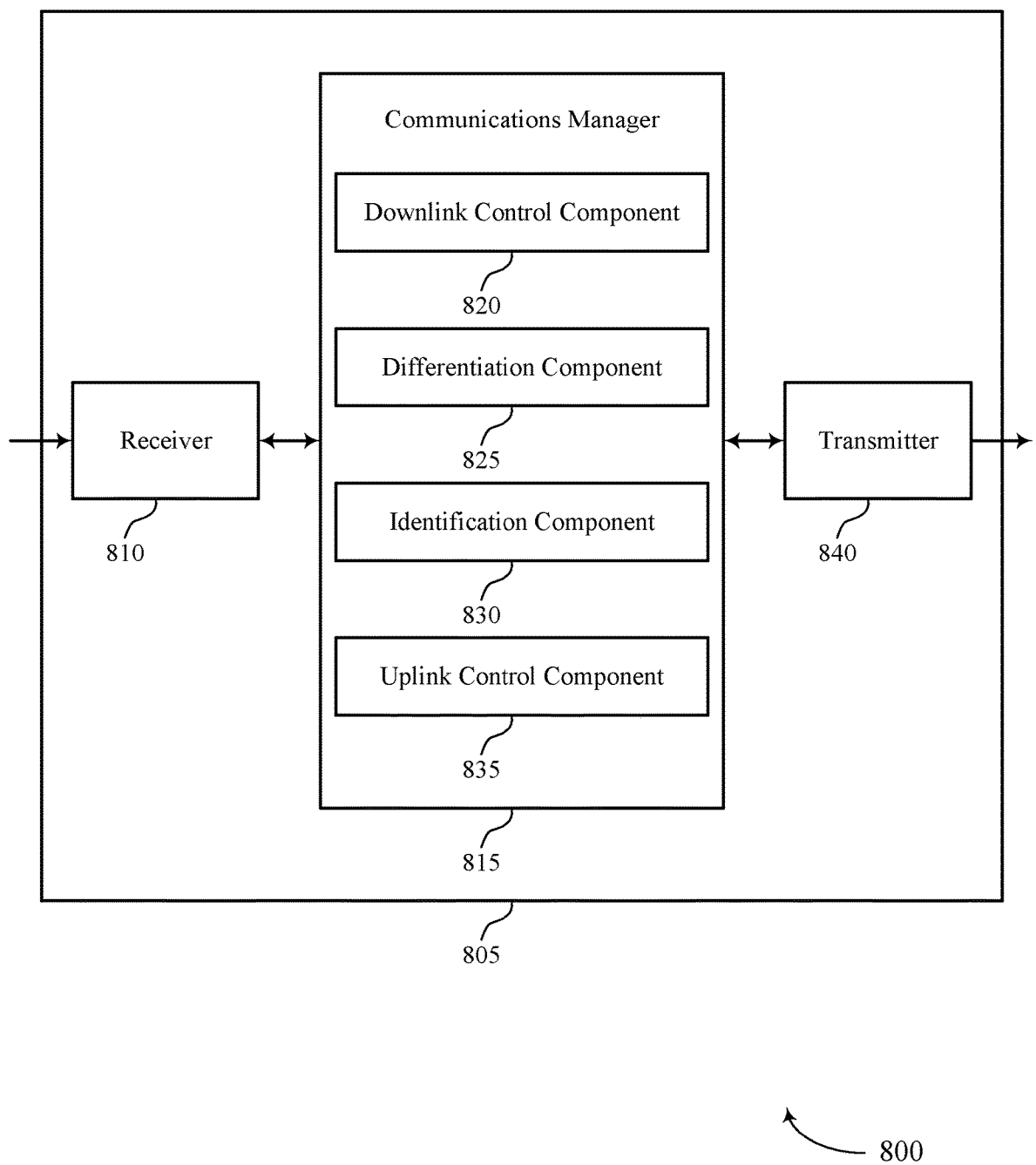

FIG. 8 shows a block diagram 800 of a device 805 that supports PUCCH carrying HARQ-A for multi-TRP with non-ideal backhaul in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to PUCCH carrying HARQ-A for multi-TRP with non-ideal backhaul, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a downlink control component 820, a differentiation component 825, an identification component 830, and an uplink control component 835. The communications manager 815 may be an example of aspects of the communications manager 1010 described herein.

The downlink control component 820 may receive a first downlink control message from a first transmission reception point and a second downlink control message from a second transmission reception point.

In some examples, the differentiation component 825 may determine, based on the receiving, that downlink control information of the first downlink control message is associated with the first transmission reception point and that downlink control information of the second downlink control message is associated with the second transmission reception point.

In other cases, the differentiation component 825 may determine, based on the receiving, that downlink control information of the first downlink control message includes a first resource indication value for the first transmission reception point and that downlink control information of the second downlink control message includes a second resource indication value for the second transmission reception point.

In some examples, he identification component 830 may identify a first index value in the downlink control information of the first downlink control message and a second index value in the downlink control information of the second downlink control message.

In some examples, the identification component 830 may identify a first resource group associated with the first resource indication value and a second resource group associated with the second resource indication value.

In some examples, he identification component 830 may identify that downlink control information of the first downlink control message includes a first resource indication value and that downlink control information of the second downlink control message includes a second resource indication value.

In some examples, the uplink control component 835 may transmit, based on the first index value and the second index value, a first uplink control message to the first transmission reception point on a first beam and the second uplink control message to the second transmission reception point on a second beam.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
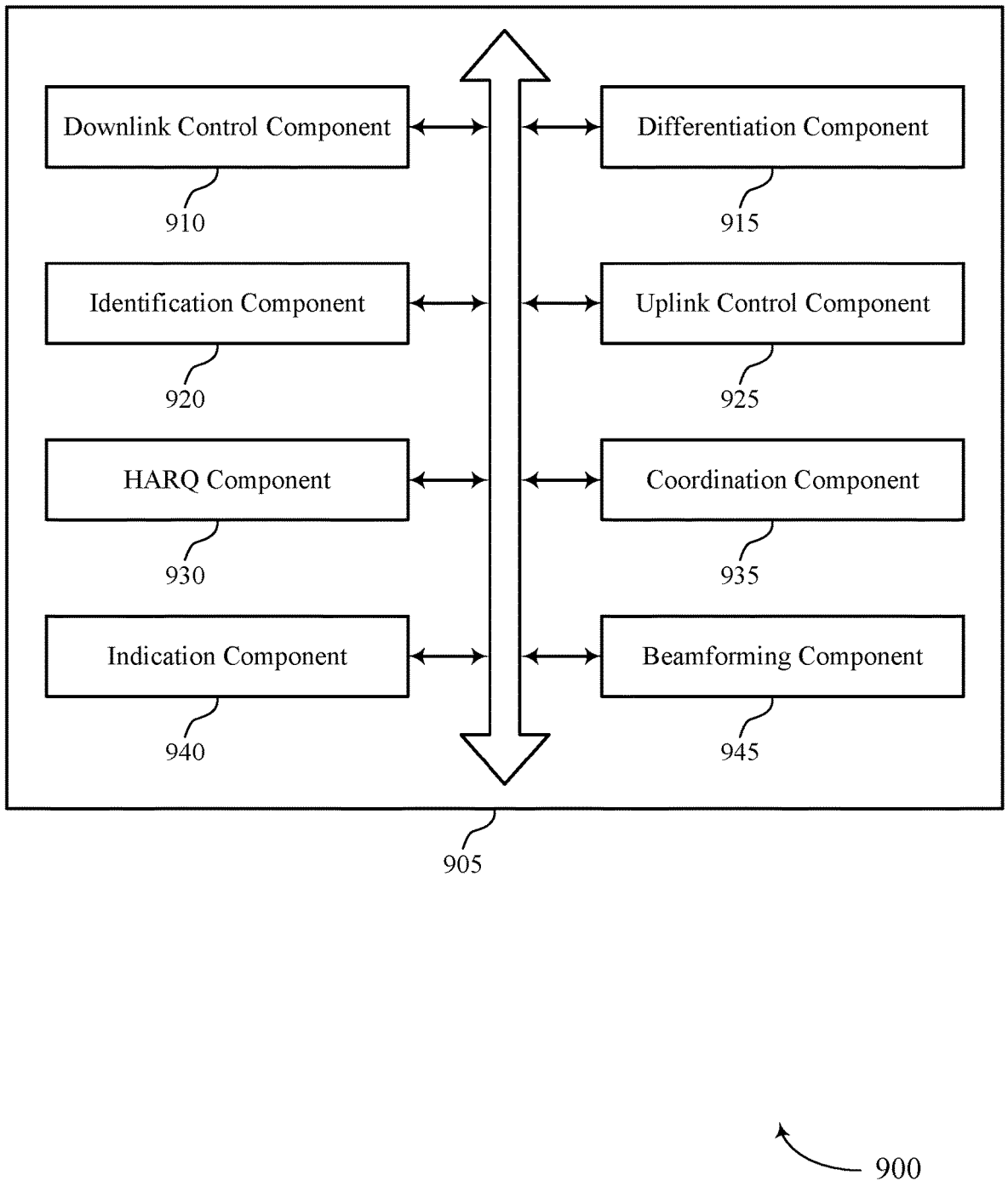
FIG. 9 shows a block diagram of a communications manager that supports PUCCH carrying HARQ-A for multi-TRP with non-ideal backhaul in accordance with aspects of the present disclosure.

FIG. 9 shows a block diagram 900 of a communications manager 905 that supports PUCCH carrying HARQ-A for multi-TRP with non-ideal backhaul in accordance with aspects of the present disclosure. The communications manager 905 may be an example of aspects of a communications manager 715, a communications manager 815, or a communications manager 1010 described herein. The communications manager 905 may include a downlink control component 910, a differentiation component 915, an identification component 920, an uplink control component 925, a HARQ component 930, a coordination component 935, an indication component 940, and a beamforming component 945. Each of these modules may communicate, directly or indirectly, with one another (e.g., via one or more buses).

The downlink control component 910 may receive a first downlink control message from a first transmission reception point and a second downlink control message from a second transmission reception point.

In some examples, the downlink control component 910 may receive a first downlink control message from a first transmission reception point and a second downlink control message from a second transmission reception point. In some examples, the downlink control component 910 may receive a first downlink control message from a first transmission reception point and a second downlink control message from a second transmission reception point.

The differentiation component 915 may determine, based on the receiving, that downlink control information of the first downlink control message is associated with the first transmission reception point and that downlink control information of the second downlink control message is associated with the second transmission reception point.

In some examples, the determining further includes determining, based on the receiving, that downlink control information of the first downlink control message includes a first resource indication value for the first transmission reception point and that downlink control information of the second downlink control message includes a second resource indication value for the second transmission reception point.

In some examples, the differentiation component 915 may determine, based on the receiving, downlink control information of the first downlink control message is associated with the first transmission reception point and downlink control information of the second downlink control message is associated with the second transmission reception point.

In some examples, the determining further includes determining, based on the indication, a first configured resource set for the first transmission reception point and a second configured resource set for the second transmission reception point in the uplink control message. In some examples, the determining further includes, determining, based on the identifying, downlink control information of the first downlink control message is associated with the first transmission reception point and the downlink control information of the second downlink control message is associated with the second transmission reception point. In some examples, the determining further includes, determining the first resource indication value based on identifying the last downlink control information of the first downlink control message and determining the second resource indication value based on identifying the last downlink control information of the second downlink control message.

The identification component 920 may identify a first index value in the downlink control information of the first downlink control message and a second index value in the downlink control information of the second downlink control message.

In some examples, the identification component 920 may identify a first resource group associated with the first resource indication value and a second resource group associated with the second resource indication value.

In some examples, the identification component 920 may identify a first set of time and frequency resources in the first uplink control message based on the first index value. In some examples, the identification component 920 may identify a second set of time and frequency resources in the second uplink control message based on the second index value. In some examples, the identification component 920 may identify the first resource indication value and the second resource indication value.

In some examples, the identification component 920 may identify the first resource group is based on a bit included in the first resource indication value. In some examples, the identification component 920 may where identifying the second resource group is based on a bit included in the second resource indication value. In some examples, the identification component 920 may identify a first set of time and frequency resources in the first resource group based on one or more additional bits included in the first resource indication value.

In some examples, the identification component 920 may identify a second set of time and frequency resources in the second resource group based on one or more additional bits included in the second resource indication value. In some examples, the identification component 920 may identify a last downlink control information of the first downlink control message and a last downlink control information of the second downlink control message. In some examples, the identification component 920 may identify a first resource group in the uplink control message based on the determining, the first resource group associated with the first transmission reception point.

In some examples, the identification component 920 may identify a second resource group in the uplink control message based on the determining, the second resource group associated with the second transmission reception point. In some examples, the identification component 920 may identify a first set of time and frequency resources based on the first resource indication value, the first set of time and frequency resources included in a first resource group. In some examples, the identification component 920 may identify a second set of time and frequency resources based on the second resource indication value, the second set of time and frequency resources included in a second resource group. In some examples, the identification component 920 may identify a last downlink control information of the first downlink control message and a last downlink control information of the second downlink control message.

In some examples, the first index value includes a first feedback timing indicator value from a first configured or default set of feedback timing indicator values and the second index value includes a second feedback timing indicator value from a second configured or default set of feedback timing indicator values. In some examples, the first configured or default set of feedback timing indicator values includes at least one feedback timing indicator value different from the second configured or default set of feedback timing indicator values.

In some examples, the first resource indication value includes a first physical uplink control channel resource indication index value and the second index value includes a second physical uplink control channel resource indication index value. In some examples, the first resource indication value includes a first physical uplink control channel resource indication index value and the second index value includes a second physical uplink control channel resource indication index value.

The uplink control component 925 may transmit, based on the first index value and the second index value, a first uplink control message to the first transmission reception point on a first beam and the second uplink control message to the second transmission reception point on a second beam.

In some examples, the uplink control component 925 may transmit, based on the first resource group and the second resource group, a first uplink control message to the first transmission reception point on a first beam and the second uplink control message to the second transmission reception point on a second beam.

In some examples, the uplink control component 925 may transmit, based on the first resource indication value and the second resource indication value, a first uplink control message to the first transmission reception point on a first beam and the second uplink control message to the second transmission reception point on a second beam.

In some examples, the uplink control component 925 may schedule uplink control information for the first transmission reception point on the first set of time and frequency resources. In some examples, the uplink control component 925 may schedule uplink control information for the second transmission reception point on the second set of time and frequency resources.

In some examples, the first set of time and frequency resources includes resources in a first slot of the first uplink control message and the second set of time and frequency resources includes resources in a second slot of the second uplink control message.

In some examples, the first set of time and frequency resources includes resources in a first set of orthogonal frequency division multiplexed symbols in a slot of the first uplink control message and the second set of time and frequency resources includes resources in a second set of orthogonal frequency division multiplexed symbols, different from the first set of orthogonal frequency division multiplexed symbols, in the slot of the second uplink control message.

In some examples, the first set of time and frequency resources corresponds to a first antenna array configuration of the UE and the second set of time and frequency resources corresponds to a second antenna array configuration of the UE.

The HARQ component 930 may indicate a one or more HARQ payloads on the uplink control transmission, the one or more HARQ payloads directed to at least the first transmission reception point or the second transmission reception point. In some examples, the first uplink control message includes a first hybrid automatic repeat request payload and the second uplink control message includes a second hybrid automatic repeat request payload.

The coordination component 935 may receive a radio resource control message including an indication of semi-static coordination and a splitting of resources in the uplink control message between the first transmission reception point and the second transmission reception point.

In some examples, the first configured resource set includes a first set of time and frequency resources associated with the first transmission reception point and the second configured resource set includes a second set of time and frequency resources, different from the first set of time and frequency resources, and associated with the second transmission reception point.

The indication component 940 may receive a first indication in the downlink control information of the first downlink control message and a second indication in the downlink control information of the second downlink control message. In some examples, the first indication includes an explicit or implicit indication and the second indication includes an explicit or implicit indication.

The beamforming component 945 may determine a first activated beam index corresponding to the first beam, the first activated beam index included in a set of beam indices configured by a radio resource control configuration. In some examples, the beamforming component 945 may determine a second activated beam index corresponding to the second beam, the second activated beam index included in the set of beam indices.

In some examples, the beamforming component 945 may determine the first activated beam index is based on a first resource indication value for uplink control transmission in the downlink control information of the first downlink control message. In some examples, the beamforming component 945 may where determining the second activated beam index is based on a second resource indication value for uplink control transmission in the downlink control information of the second downlink control message.

In some examples, the beamforming component 945 may determine the first activated beam index is based on the determining that downlink control information of the first downlink control message is associated with the first transmission reception point. In some examples, the beamforming component 945 may where determining the second activated beam index is based on the determining that downlink control information of the second downlink control message is associated with the second transmission reception point.

In some examples, the beamforming component 945 may determine the first activated beam index is based on the first index value. In some examples, the beamforming component 945 may determine the second activated beam index is based on the second index value.

In some examples, the first activated beam index is associated with the first resource group or an element of the first resource group and the second activated beam index is associated with the second resource group or an element of the second resource group.

In some examples, the first activated beam index is included in a first set of beam indices configured by radio resource control and the second activated beam index is included in a second set of beam indices, different from the first set of beam indices, and configured by radio resource control.

Figure 10:
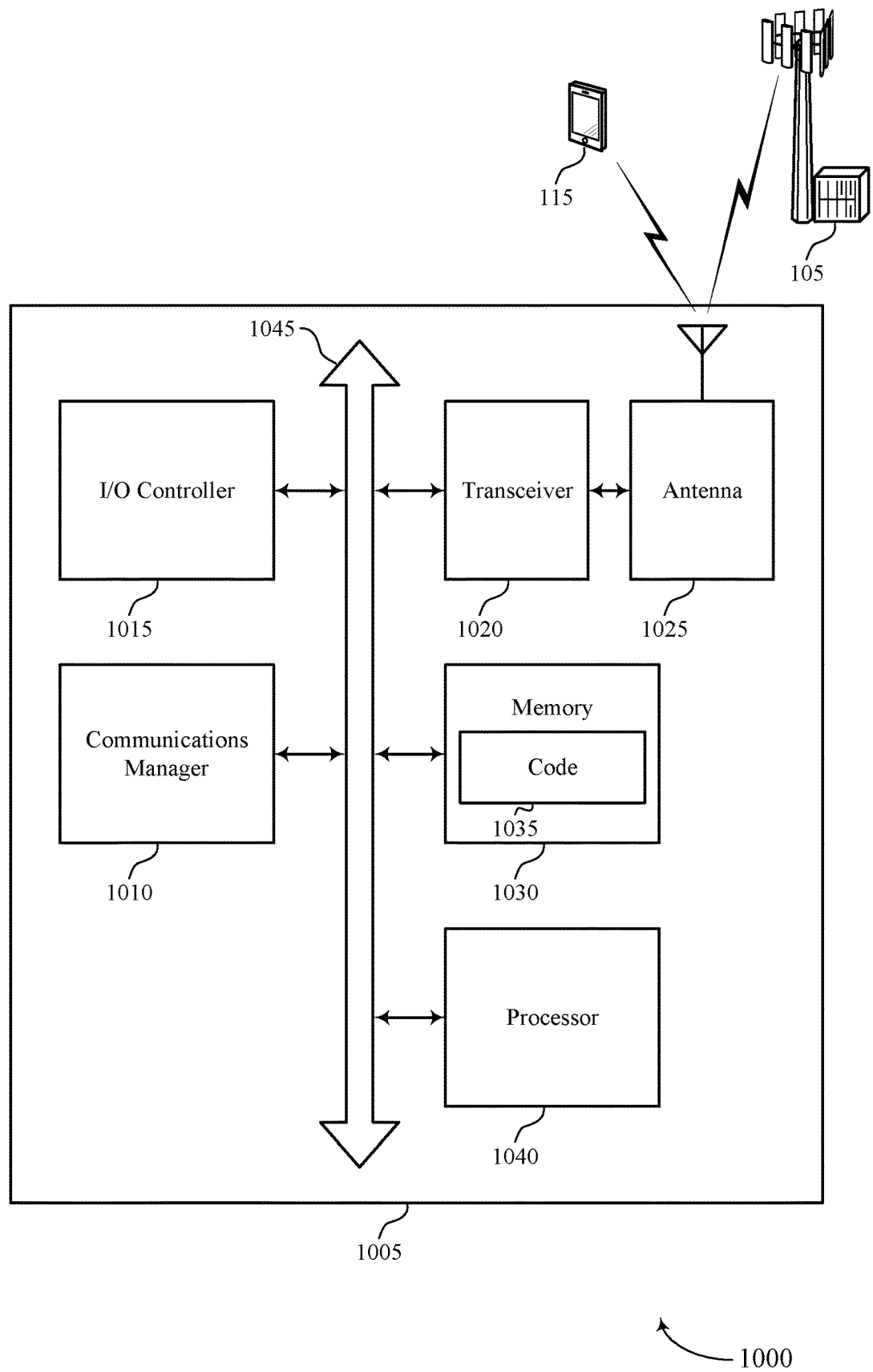
FIG. 10 shows a diagram of a system including a device that supports PUCCH carrying HARQ-A for multi-TRP with non-ideal backhaul in accordance with aspects of the present disclosure.

FIG. 10 shows a diagram of a system 1000 including a device 1005 that supports PUCCH carrying HARQ-A for multi-TRP with non-ideal backhaul in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some examples, the communications manager 1010 may receive a first downlink control message from a first transmission reception point and a second downlink control message from a second transmission reception point, determine, based on the receiving, that downlink control information of the first downlink control message is associated with the first transmission reception point and that downlink control information of the second downlink control message is associated with the second transmission reception point, identify a first index value in the downlink control information of the first downlink control message and a second index value in the downlink control information of the second downlink control message, and transmit, based on the first index value and the second index value, a first uplink control message and a second uplink control message.

In some examples, the communications manager 1010 may also receive a first downlink control message from a first transmission reception point and a second downlink control message from a second transmission reception point, determine, based on the receiving, that downlink control information of the first downlink control message includes a first resource indication value for the first transmission reception point and that downlink control information of the second downlink control message includes a second resource indication value for the second transmission reception point, identify a first resource group associated with the first resource indication value and a second resource group associated with the second resource indication value, and transmit, based on the first resource group and the second resource group, a first uplink control message and a second uplink control message.

In some examples, the communications manager 1010 may also receive a first downlink control message from a first transmission reception point and a second downlink control message from a second transmission reception point, determine, based on the receiving, downlink control information of the first downlink control message is associated with the first transmission reception point and downlink control information of the second downlink control message is associated with the second transmission reception point, identify that downlink control information of the first downlink control message includes a first resource indication value and that downlink control information of the second downlink control message includes a second resource indication value, and transmit, based on the first resource indication value and the second resource indication value, a first uplink control message and a second uplink control message.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some examples the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some examples, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting PUCCH carrying HARQ-A for multi-TRP with non-ideal backhaul).

Based on determining separate PUCCH transmissions carrying HARQ indications for the received data, the processor 1040 may more efficiently receive and transmit data on an otherwise non-ideal backhaul link. As such, the processor may be ready to respond more efficiently through the reduction of a ramp up in processing power.

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (e.g., when compiled and executed) to perform functions described herein.

Figure 11:
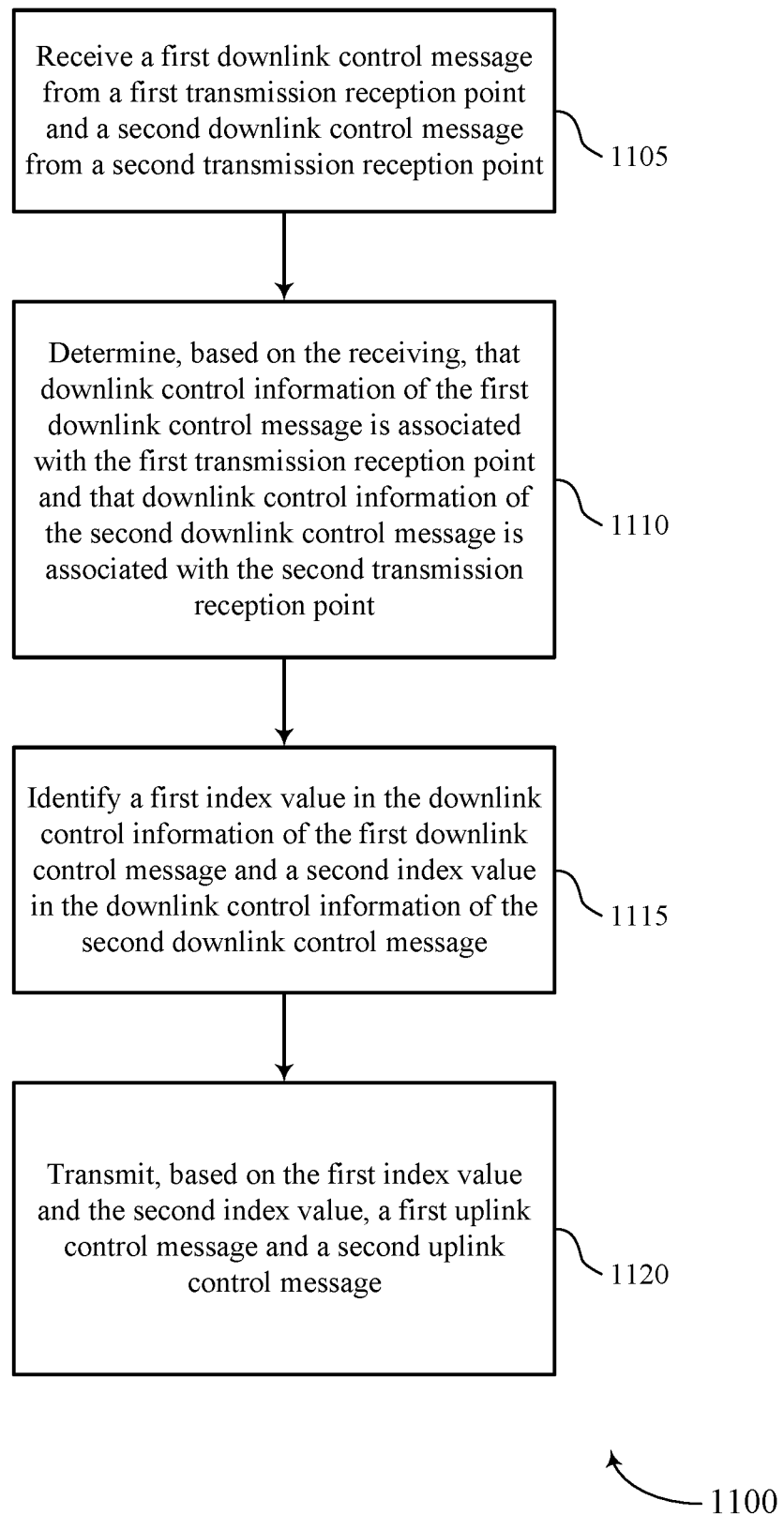
FIGS. 11 through 15 show flowcharts illustrating methods that support PUCCH carrying HARQ-A for multi-TRP with non-ideal backhaul in accordance with aspects of the present disclosure.

FIG. 11 shows a flowchart illustrating a method 1100 that supports PUCCH carrying HARQ-A for multi-TRP with non-ideal backhaul in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive a first downlink control message from a first transmission reception point and a second downlink control message from a second transmission reception point. The operations of 1105 may be performed according to the methods described herein. In some examples, aspects of the operations of 1105 may be performed by a downlink control component as described with reference to FIGS. 7 through 10.

At 1110, the UE may determine, based on the receiving, that downlink control information of the first downlink control message is associated with the first transmission reception point and that downlink control information of the second downlink control message is associated with the second transmission reception point. The operations of 1110 may be performed according to the methods described herein. In some examples, aspects of the operations of 1110 may be performed by a differentiation component as described with reference to FIGS. 7 through 10.

At 1115, the UE may identify a first index value in the downlink control information of the first downlink control message and a second index value in the downlink control information of the second downlink control message. The operations of 1115 may be performed according to the methods described herein. In some examples, aspects of the operations of 1115 may be performed by an identification component as described with reference to FIGS. 7 through 10.

At 1120, the UE may transmit, based on the first index value and the second index value, a first uplink control message and a second uplink control message. The operations of 1120 may be performed according to the methods described herein. In some examples, aspects of the operations of 1120 may be performed by an uplink control component as described with reference to FIGS. 7 through 10.

Figure 12:
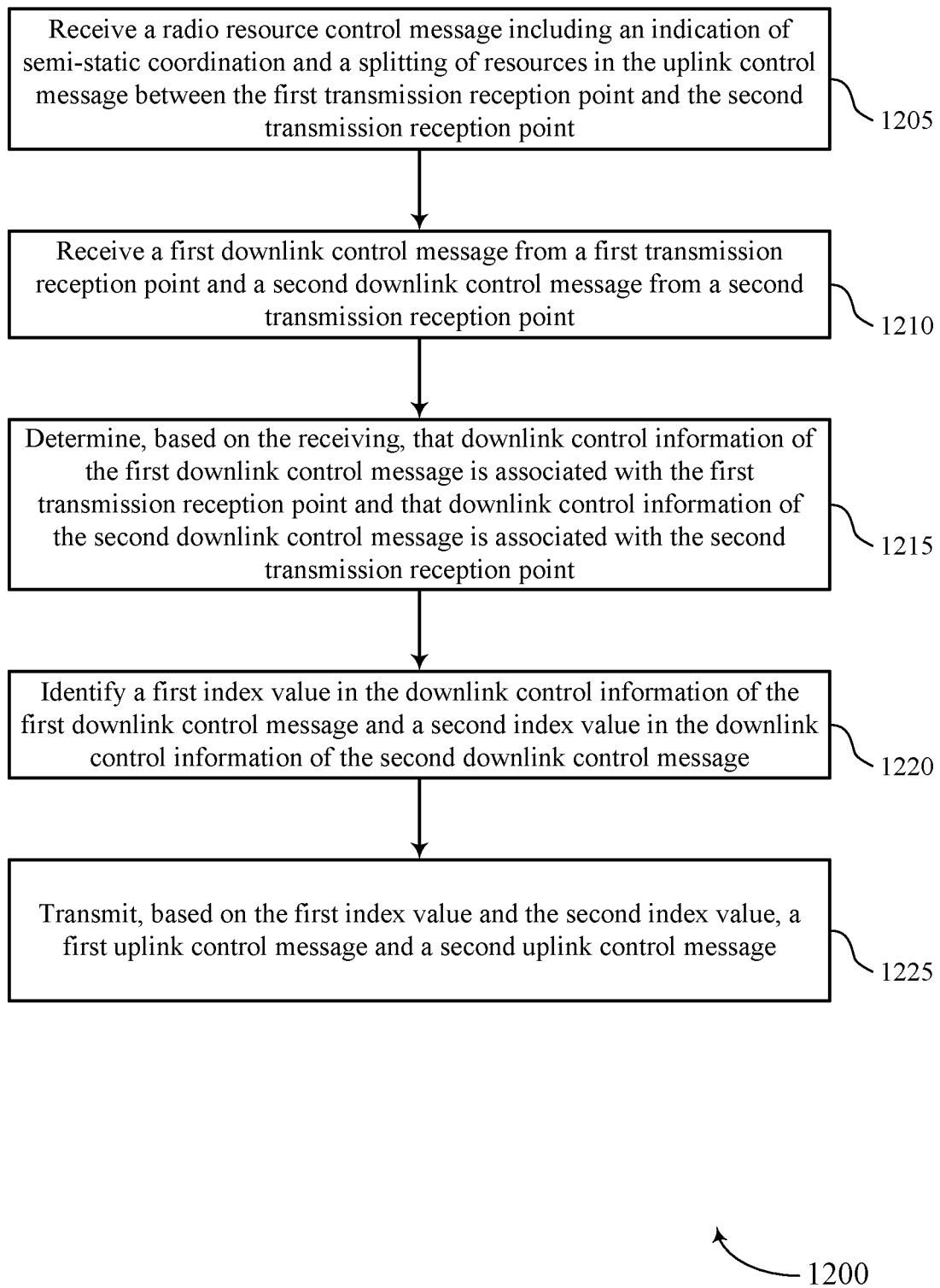

FIG. 12 shows a flowchart illustrating a method 1200 that supports PUCCH carrying HARQ-A for multi-TRP with non-ideal backhaul in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive a radio resource control message including an indication of semi-static coordination and a splitting of resources in the uplink control message between the first transmission reception point and the second transmission reception point. The operations of 1205 may be performed according to the methods described herein. In some examples, aspects of the operations of 1205 may be performed by a coordination component as described with reference to FIGS. 7 through 10.

At 1210, the UE may receive a first downlink control message from a first transmission reception point and a second downlink control message from a second transmission reception point. The operations of 1210 may be performed according to the methods described herein. In some examples, aspects of the operations of 1210 may be performed by a downlink control component as described with reference to FIGS. 7 through 10.

At 1215, the UE may determine, based on the receiving, that downlink control information of the first downlink control message is associated with the first transmission reception point and that downlink control information of the second downlink control message is associated with the second transmission reception point. The operations of 1215 may be performed according to the methods described herein. In some examples, aspects of the operations of 1215 may be performed by a differentiation component as described with reference to FIGS. 7 through 10.

At 1220, the UE may identify a first index value in the downlink control information of the first downlink control message and a second index value in the downlink control information of the second downlink control message. The operations of 1220 may be performed according to the methods described herein. In some examples, aspects of the operations of 1220 may be performed by an identification component as described with reference to FIGS. 7 through 10.

At 1225, the UE may transmit, based on the first index value and the second index value, a first uplink control message and a second uplink control message. The operations of 1225 may be performed according to the methods described herein. In some examples, aspects of the operations of 1225 may be performed by an uplink control component as described with reference to FIGS. 7 through 10.

Figure 13:
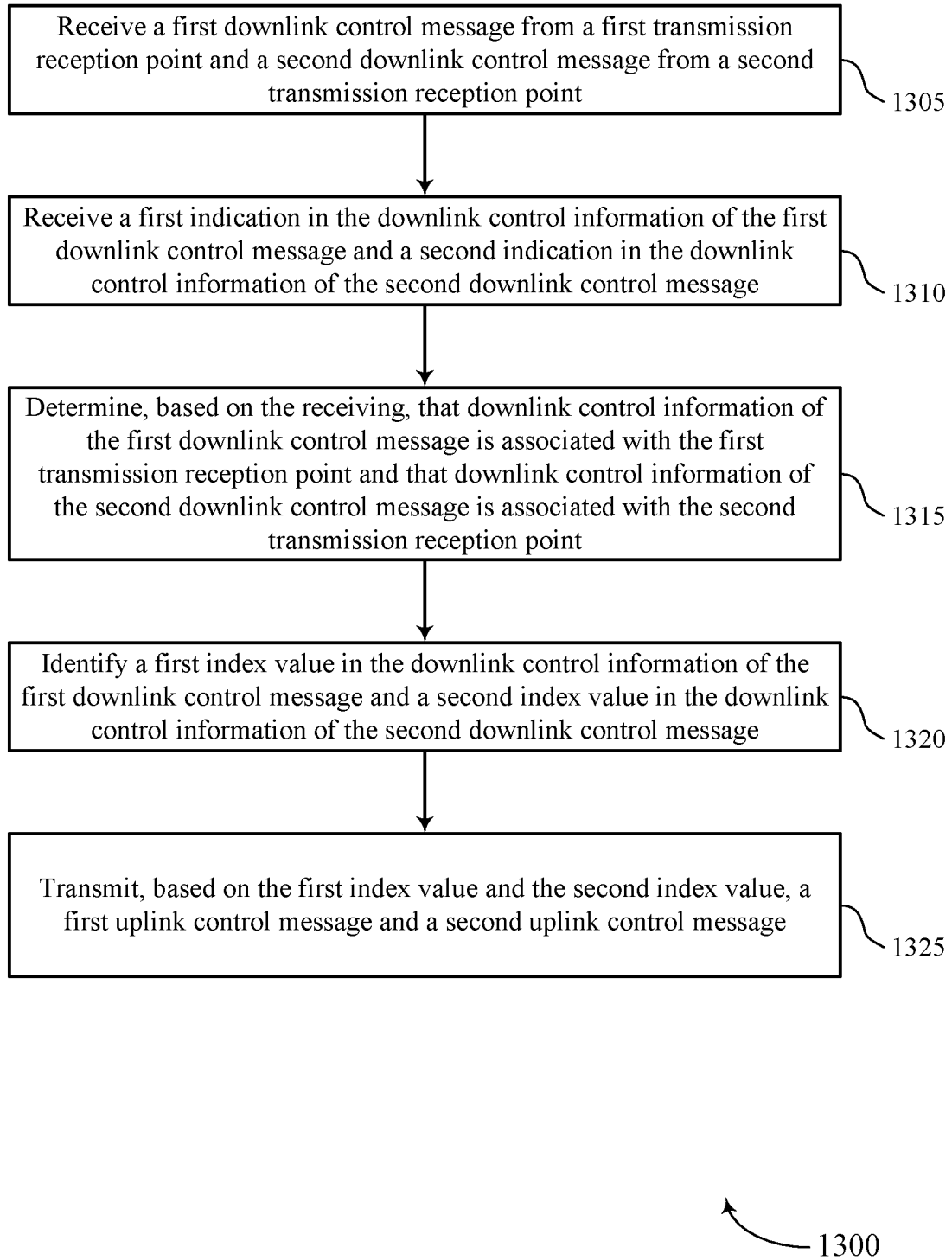

FIG. 13 shows a flowchart illustrating a method 1300 that supports PUCCH carrying HARQ-A for multi-TRP with non-ideal backhaul in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive a first downlink control message from a first transmission reception point and a second downlink control message from a second transmission reception point. The operations of 1305 may be performed according to the methods described herein. In some examples, aspects of the operations of 1305 may be performed by a downlink control component as described with reference to FIGS. 7 through 10.

At 1310, the UE may receive a first indication in the downlink control information of the first downlink control message and a second indication in the downlink control information of the second downlink control message. The operations of 1310 may be performed according to the methods described herein. In some examples, aspects of the operations of 1310 may be performed by an indication component as described with reference to FIGS. 7 through 10.

At 1315, the UE may determine, based on the receiving, that downlink control information of the first downlink control message is associated with the first transmission reception point and that downlink control information of the second downlink control message is associated with the second transmission reception point. The operations of 1315 may be performed according to the methods described herein. In some examples, aspects of the operations of 1315 may be performed by a differentiation component as described with reference to FIGS. 7 through 10.

At 1320, the UE may identify a first index value in the downlink control information of the first downlink control message and a second index value in the downlink control information of the second downlink control message. The operations of 1320 may be performed according to the methods described herein. In some examples, aspects of the operations of 1320 may be performed by an identification component as described with reference to FIGS. 7 through 10.

At 1325, the UE may transmit, based on the first index value and the second index value, a first uplink control message and a second uplink control message. The operations of 1325 may be performed according to the methods described herein. In some examples, aspects of the operations of 1325 may be performed by an uplink control component as described with reference to FIGS. 7 through 10.

Figure 14:
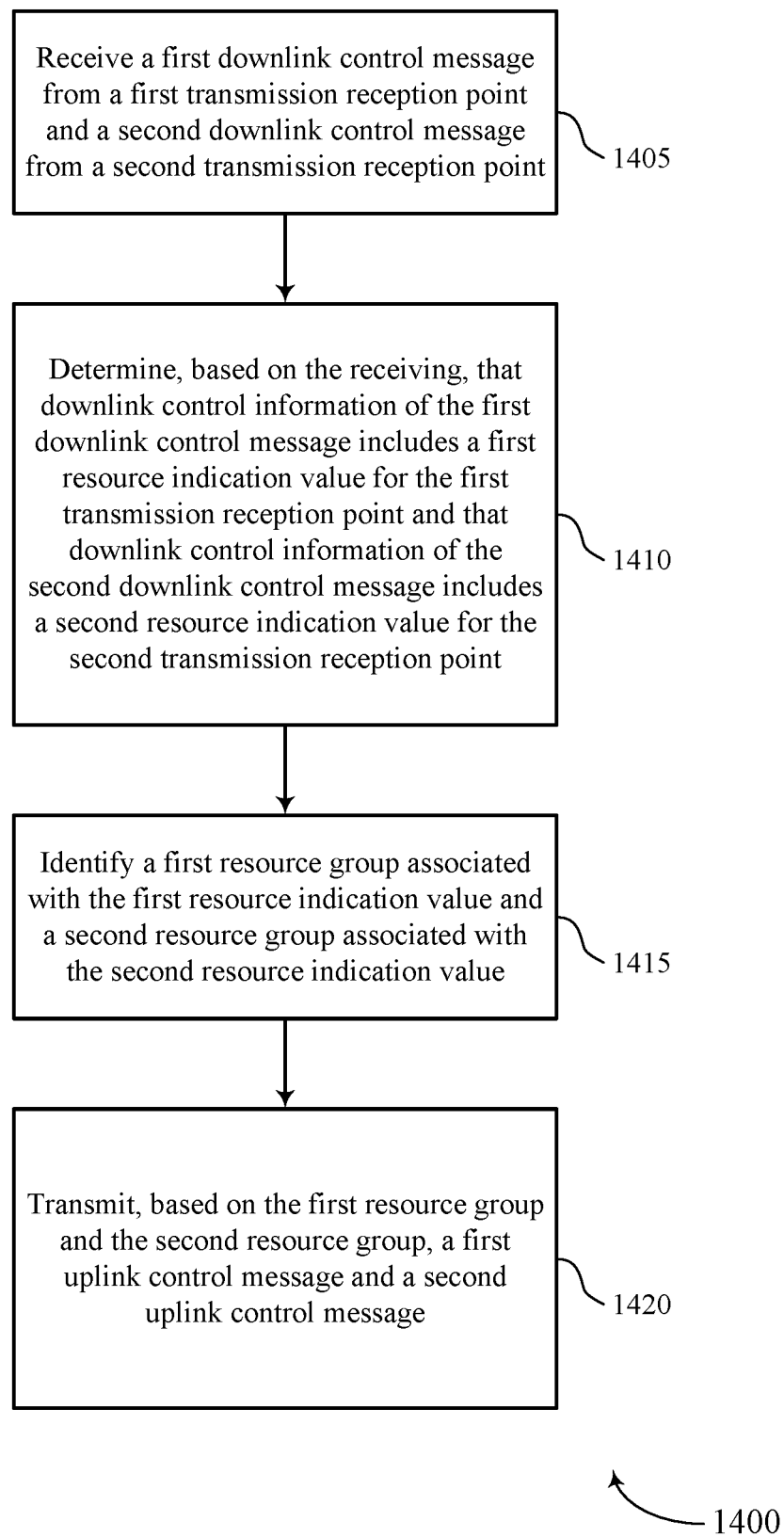

FIG. 14 shows a flowchart illustrating a method 1400 that supports PUCCH carrying HARQ-A for multi-TRP with non-ideal backhaul in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may receive a first downlink control message from a first transmission reception point and a second downlink control message from a second transmission reception point. The operations of 1405 may be performed according to the methods described herein. In some examples, aspects of the operations of 1405 may be performed by a downlink control component as described with reference to FIGS. 7 through 10.

At 1410, the UE may determine, based on the receiving, that downlink control information of the first downlink control message includes a first resource indication value for the first transmission reception point and that downlink control information of the second downlink control message includes a second resource indication value for the second transmission reception point. The operations of 1410 may be performed according to the methods described herein. In some examples, aspects of the operations of 1410 may be performed by a differentiation component as described with reference to FIGS. 7 through 10.

At 1415, the UE may identify a first resource group associated with the first resource indication value and a second resource group associated with the second resource indication value. The operations of 1415 may be performed according to the methods described herein. In some examples, aspects of the operations of 1415 may be performed by an identification component as described with reference to FIGS. 7 through 10.

At 1420, the UE may transmit, based on the first resource group and the second resource group, a first uplink control message and a second uplink control message. The operations of 1420 may be performed according to the methods described herein. In some examples, aspects of the operations of 1420 may be performed by an uplink control component as described with reference to FIGS. 7 through 10.

Figure 15:
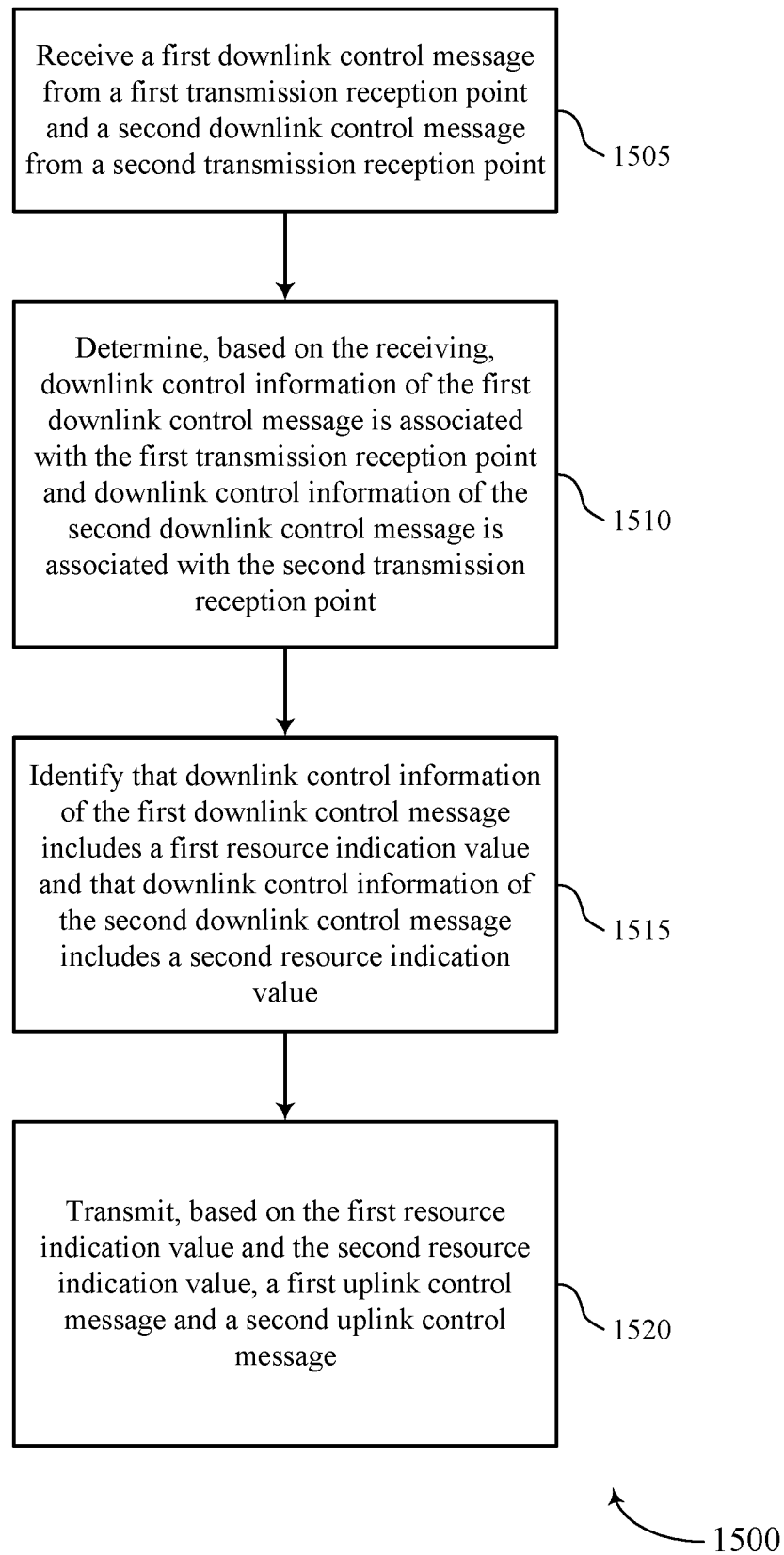

FIG. 15 shows a flowchart illustrating a method 1500 that supports PUCCH carrying HARQ-A for multi-TRP with non-ideal backhaul in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a first downlink control message from a first transmission reception point and a second downlink control message from a second transmission reception point. The operations of 1505 may be performed according to the methods described herein. In some examples, aspects of the operations of 1505 may be performed by a downlink control component as described with reference to FIGS. 7 through 10.

At 1510, the UE may determine, based on the receiving, downlink control information of the first downlink control message is associated with the first transmission reception point and downlink control information of the second downlink control message is associated with the second transmission reception point. The operations of 1510 may be performed according to the methods described herein. In some examples, aspects of the operations of 1510 may be performed by a differentiation component as described with reference to FIGS. 7 through 10.

At 1515, the UE may identify that downlink control information of the first downlink control message includes a first resource indication value and that downlink control information of the second downlink control message includes a second resource indication value. The operations of 1515 may be performed according to the methods described herein. In some examples, aspects of the operations of 1515 may be performed by an identification component as described with reference to FIGS. 7 through 10.

At 1520, the UE may transmit, based on the first resource indication value and the second resource indication value, a first uplink control message and a second uplink control message. The operations of 1520 may be performed according to the methods described herein. In some examples, aspects of the operations of 1520 may be performed by an uplink control component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
 receiving a first downlink control message from a first transmission reception point and a second downlink control message from a second transmission reception point, wherein at least one of the first downlink control message or the second downlink control message comprises two or more downlink control message transmissions;

identifying a last downlink control information transmission of the first downlink control message and a last downlink control information transmission of the second downlink control message;

determining that downlink control information of the first downlink control message comprises a first resource indication value for the first transmission reception point and that downlink control information of the second downlink control message comprises a second resource indication value for the second transmission reception point, wherein determining the first resource indication value is based at least in part on identifying the last downlink control information transmission of the first downlink control message and determining the second resource indication value is based at least in part on identifying the last downlink control information transmission of the second downlink control message;

determining, based at least in part on the first resource indication value and the second resource indication value, that the downlink control information of the first downlink control message is associated with the first transmission reception point and the downlink control information of the second downlink control message is associated with the second transmission reception point;

identifying a first resource of a first resource group associated with the first resource indication value and a second resource of a second resource group associated with the second resource indication value; and transmitting, based at least in part on the first resource of the first resource group and the second resource of the second resource group, a first uplink control message and a second uplink control message.

2. The method of claim 1, wherein the first uplink control message comprises a first hybrid automatic repeat request payload and the second uplink control message comprises a second hybrid automatic repeat request payload.

3. The method of claim 1, wherein:
identifying the first resource group is based at least in part on a bit included in the first resource indication value; and
wherein identifying the second resource group is based at least in part on a bit included in the second resource indication value.

4. The method of claim 1, further comprising:
identifying a first set of time and frequency resources in the first resource group based at least in part on one or more additional bits included in the first resource indication value; and
identifying a second set of time and frequency resources in the second resource group based at least in part on one or more additional bits included in the second resource indication value.

5. The method of claim 4, wherein the first set of time and frequency resources comprises resources in a first slot of the first uplink control message and the second set of time and frequency resources comprises resources in a second slot of the second uplink control message.

6. The method of claim 4, wherein the first set of time and frequency resources comprises resources in a first set of orthogonal frequency division multiplexed symbols in a slot of the first uplink control message and the second set of time and frequency resources comprises resources in a second set of orthogonal frequency division multiplexed symbols in the slot of the second uplink control message.

7. The method of claim 4, wherein the first set of time and frequency resources comprises a first set of resource blocks within an orthogonal frequency division multiplexed symbol and the second set of time and frequency resources comprises a second set of resource blocks within the orthogonal frequency division multiplexed symbol, the first set of resource blocks frequency division multiplexed with the second set of resource blocks.

8. The method of claim 4, wherein the first set of time and frequency resources corresponds to a first antenna array configuration of the UE and the second set of time and frequency resources corresponds to a second antenna array configuration of the UE.

9. The method of claim 1, wherein the first uplink control message is transmitted to the first transmission reception point on a first beam and the second uplink control message is transmitted to the second transmission reception point on a second beam.

10. The method of claim 9, wherein the transmitting further comprises:
determining a first activated beam index corresponding to the first beam based at least in part on the first resource indication value; and
determining a second activated beam index corresponding to the second beam based at least in part on the second resource indication value.

11. The method of claim 10, wherein the first activated beam index is associated with the first resource group or an element of the first resource group and the second activated beam index is associated with the second resource group or an element of the second resource group.

12. The method of claim 10, wherein the first activated beam index is included in a first set of beam indices configured by radio resource control and the second activated beam index is included in a second set of beam indices, different from the first set of beam indices, and configured by radio resource control.

13. The method of claim 1, wherein the first resource indication value comprises a first physical uplink control channel resource indication index value and the second resource indication value comprises a second physical uplink control channel resource indication index value.

14. A method for wireless communication at a user equipment (UE), comprising:
receiving a first downlink control message from a first transmission reception point and a second downlink control message from a second transmission reception point, wherein at least one of the first downlink control message or the second downlink control message comprises two or more downlink control message transmissions;

identifying a last downlink control information transmission of the first downlink control message and a last downlink control information transmission of the second downlink control message;

identifying that downlink control information of the first downlink control message comprises a first resource indication value and that downlink control information of the second downlink control message comprises a second resource indication value, wherein identifying the first resource indication value is based at least in part on identifying the last downlink control information transmission of the first downlink control message and identifying the second resource indication value is based at least in part on identifying the last downlink control information transmission of the second downlink control message;

determining, based at least in part on the first resource indication value and the second resource indication value, that the downlink control information of the first downlink control message is associated with the first transmission reception point and the downlink control information of the second downlink control message is associated with the second transmission reception point; and transmitting, based at least in part on the first resource indication value and the second resource indication value, a first uplink control message and a second uplink control message.

15. The method of claim 14, wherein the first uplink control message comprises a first hybrid automatic repeat request payload and the second uplink control message comprises a second hybrid automatic repeat request payload.

16. The method of claim 14, further comprising:
receiving a first indication in the downlink control information of the first downlink control message and a second indication in the downlink control information of the second downlink control message; and wherein the determining is based at least in part on the first indication or the second indication.

17. The method of claim 16, wherein the first indication comprises an explicit or implicit indication and the second indication comprises an explicit or implicit indication.

18. The method of claim 14, further comprising:
identifying a first resource group in the first uplink control message based at least in part on the determining, the first resource group associated with the first transmission reception point; and identifying a second resource group in the second uplink control message based at least in part on the determining, the second resource group associated with the second transmission reception point.

19. The method of claim 14, further comprising:
identifying a first set of time and frequency resources based at least in part on the first resource indication value, the first set of time and frequency resources included in a first resource group; and identifying a second set of time and frequency resources based at least in part on the second resource indication value, the second set of time and frequency resources included in a second resource group.

20. The method of claim 19, wherein the first set of time and frequency resources comprises resources in a first slot of the first uplink control message and the second set of time and frequency resources comprises resources in a second slot of the second uplink control message.

21. The method of claim 19, wherein the first set of time and frequency resources comprises resources in a first set of orthogonal frequency division multiplexed symbols in a slot of the first uplink control message and the second set of time and frequency resources comprises resources in a second set of orthogonal frequency division multiplexed symbols in the slot of the second uplink control message.

22. The method of claim 19, wherein the first set of time and frequency resources comprises a first set of resource blocks within an orthogonal frequency division multiplexed symbol and the second set of time and frequency resources comprises a second set of resource blocks within the orthogonal frequency division multiplexed symbol, the first set of resource blocks frequency division multiplexed with the second set of resource blocks.

23. The method of claim 19, wherein the first set of time and frequency resources corresponds to a first antenna array configuration of the UE and the second set of time and frequency resources corresponds to a second antenna array configuration of the UE.

24. The method of claim 14, wherein the first uplink control message is transmitted to the first transmission reception point on a first beam and the second uplink control message is transmitted to the second transmission reception point on a second beam.

25. The method of claim 24, wherein the transmitting further comprises:
determining a first activated beam index corresponding to the first beam based at least in part on the first resource indication value; and determining a second activated beam index corresponding to the second beam based at least in part on the second resource indication value.

26. The method of claim 25, wherein the first activated beam index is included in a first set of beam indices configured by radio resource control and the second activated beam index is included in a second set of beam indices, different from the first set of beam indices, and configured by radio resource control.

27. The method of claim 14, wherein the first resource indication value comprises a first physical uplink control channel resource indication index value and the second resource indication value comprises a second physical uplink control channel resource indication index value.

28. A method for wireless communication at a user equipment (UE), comprising:
receiving a first downlink control message from a first transmission reception point and a second downlink control message from a second transmission reception point;

receiving a radio resource control message comprising an indication of semi-static coordination and a splitting of resources between the first transmission reception point and the second transmission reception point;

determining, based at least in part on the indication, a first configured resource set for the first transmission reception point and a second configured resource set for the second transmission reception point;

determining that downlink control information of the first downlink control message is associated with the first transmission reception point and that downlink control information of the second downlink control message is associated with the second transmission reception point;

identifying a first index value in the downlink control information of the first downlink control message and a second index value in the downlink control information of the second downlink control message; and transmitting a first uplink control message based at least in part on the first index value and the first configured resource set, and a second uplink control message based at least in part on the second index value and the second configured resource set.

29. The method of claim 28, wherein the first uplink control message comprises a first hybrid automatic repeat request payload and the second uplink control message comprises a second hybrid automatic repeat request payload.

30. The method of claim 28, wherein the first configured resource set comprises a first set of time and frequency resources associated with the first transmission reception point and the second configured resource set comprises a second set of time and frequency resources, different from the first set of time and frequency resources, and associated with the second transmission reception point.

31. The method of claim 28, further comprising:
receiving a first indication in the downlink control information of the first downlink control message and a second indication in the downlink control information of the second downlink control message; and
wherein determining that the downlink control information of the first downlink control message is associated with the first transmission reception point and that the downlink control information of the second downlink control message is associated with the second transmission reception point is based at least in part on the first indication or the second indication.

32. The method of claim 31, wherein the first indication comprises an explicit or implicit indication and the second indication comprises an explicit or implicit indication.

33. The method of claim 28, wherein the identifying further comprises:
identifying a first set of time and frequency resources in the first uplink control message based at least in part on the first index value; and
identifying a second set of time and frequency resources in the second uplink control message based at least in part on the second index value.

34. The method of claim 33, wherein the first set of time and frequency resources comprises resources in a first slot of the first uplink control message and the second set of time and frequency resources comprises resources in a second slot of the second uplink control message.

35. The method of claim 33, wherein the first set of time and frequency resources comprises resources in a first set of orthogonal frequency division multiplexed symbols in a slot of the first uplink control message and the second set of time and frequency resources comprises resources in a second set of orthogonal frequency division multiplexed symbols, different from the first set of orthogonal frequency division multiplexed symbols, in the slot of the second uplink control message.

36. The method of claim 28, wherein the first uplink control message is transmitted to the first transmission reception point on a first beam and the second uplink control message is transmitted to the second transmission reception point on a second beam.

37. The method of claim 36, wherein the transmitting further comprises:
determining a first activated beam index corresponding to the first beam, the first activated beam index included in a set of beam indices configured by a radio resource control configuration; and
determining a second activated beam index corresponding to the second beam, the second activated beam index included in the set of beam indices.

38. The method of claim 37, wherein:
determining the first activated beam index is based at least in part on a first resource indication value for uplink control transmission in the downlink control information of the first downlink control message; and
wherein determining the second activated beam index is based at least in part on a second resource indication value for uplink control transmission in the downlink control information of the second downlink control message.

39. The method of claim 37, wherein:
determining the first activated beam index is based at least in part on the determining that downlink control information of the first downlink control message is associated with the first transmission reception point; and
wherein determining the second activated beam index is based at least in part on the determining that downlink control information of the second downlink control message is associated with the second transmission reception point.

40. The method of claim 37, wherein:
determining the first activated beam index is based at least in part on the first index value; and
wherein determining the second activated beam index is based at least in part on the second index value.

41. The method of claim 28, wherein the first index value comprises a first feedback timing indicator value from a first configured or default set of feedback timing indicator values and the second index value comprises a second feedback timing indicator value from a second configured or default set of feedback timing indicator values.

42. The method of claim 41, wherein the first configured or default set of feedback timing indicator values includes at least one feedback timing indicator value different from the second configured or default set of feedback timing indicator values.

43. An apparatus for wireless communication at a user equipment (UE), comprising:
a processor,
memory coupled to the processor; and
instructions stored in the memory and executable by the processor to cause the apparatus to:
receive a first downlink control message from a first transmission reception point and a second downlink control message from a second transmission reception point, wherein at least one of the first downlink control message or the second downlink control message comprises two or more downlink control message transmissions;
identify a last downlink control information transmission of the first downlink control message and a last downlink control information transmission of the second downlink control message;
determine that downlink control information of the first downlink control message comprises a first resource indication value for the first transmission reception point and that downlink control information of the second downlink control message comprises a second resource indication value for the second transmission reception point, wherein determining the first resource indication value is based at least in part on identifying the last downlink control information transmission of the first downlink control message and determining the second resource indication value is based at least in part on identifying the last downlink control information transmission of the second downlink control message;
determine, based at least in part on the first resource indication value and the second resource indication value, that the downlink control information of the first downlink control message is associated with the first transmission reception point and the downlink control information of the second downlink control message is associated with the second transmission reception point;
identify a first resource of a first resource group associated with the first resource indication value and a second resource of a second resource group associated with the second resource indication value; and transmit, based at least in part on the first resource of the first resource group and the second resource of the second resource group, a first uplink control message and a second uplink control message.

44. An apparatus for wireless communication at a user equipment (UE), comprising:
a processor,
memory coupled to the processor; and
instructions stored in the memory and executable by the processor to cause the apparatus to:
receive a first downlink control message from a first transmission reception point and a second downlink control message from a second transmission reception point, wherein at least one of the first downlink control message or the second downlink control message comprises two or more downlink control message transmissions;
identify a last downlink control information transmission of the first downlink control message and a last downlink control information transmission of the second downlink control message;
identify that downlink control information of the first downlink control message comprises a first resource indication value and that downlink control information of the second downlink control message comprises a second resource indication value, wherein identifying the first resource indication value is based at least in part on identifying the last downlink control information transmission of the first downlink control message and identifying the second resource indication value is based at least in part on identifying the last downlink control information transmission of the second downlink control message;
determine, based at least in part on the first resource indication value and the second resource indication value, that the downlink control information of the first downlink control message is associated with the first transmission reception point and the downlink control information of the second downlink control message is associated with the second transmission reception point; and
transmit, based at least in part on the first resource indication value and the second resource indication value, a first uplink control message and a second uplink control message.

45. An apparatus for wireless communication at a user equipment (UE), comprising:
a processor,
memory coupled to the processor; and
instructions stored in the memory and executable by the processor to cause the apparatus to:
receive a first downlink control message from a first transmission reception point and a second downlink control message from a second transmission reception point;
receive a radio resource control message comprising an indication of semi-static coordination and a splitting of resources between the first transmission reception point and the second transmission reception point;
determine, based at least in part on the indication, a first configured resource set for the first transmission reception point and a second configured resource set for the second transmission reception point;
determine that downlink control information of the first downlink control message is associated with the first transmission reception point and that downlink control information of the second downlink control message is associated with the second transmission reception point;
identify a first index value in the downlink control information of the first downlink control message and a second index value in the downlink control information of the second downlink control message; and
transmit a first uplink control message based at least in part on the first index value and the first configured resource set, and a second uplink control message based at least in part on the second index value and the second configured resource set.

46. An apparatus for wireless communication at a user equipment (UE), comprising:
means for receiving a first downlink control message from a first transmission reception point and a second downlink control message from a second transmission reception point, wherein at least one of the first downlink control message or the second downlink control message comprises two or more downlink control message transmissions;
means for identifying a last downlink control information transmission of the first downlink control message and a last downlink control information transmission of the second downlink control message;
means for determining that downlink control information of the first downlink control message comprises a first resource indication value for the first transmission reception point and that downlink control information of the second downlink control message comprises a second resource indication value for the second transmission reception point, wherein determining the first resource indication value is based at least in part on identifying the last downlink control information transmission of the first downlink control message and determining the second resource indication value is based at least in part on identifying the last downlink control information transmission of the second downlink control message;
means for determining, based at least in part on the first resource indication value and the second resource indication value, that the downlink control information of the first downlink control message is associated with the first transmission reception point and the downlink control information of the second downlink control message is associated with the second transmission reception point;
means for identifying a first resource of a first resource group associated with the first resource indication value and a second resource of a second resource group associated with the second resource indication value; and
means for transmitting, based at least in part on the first resource of the first resource group and the second resource of the second resource group, a first uplink control message and a second uplink control message.

47. An apparatus for wireless communication at a user equipment (UE), comprising:
means for receiving a first downlink control message from a first transmission reception point and a second downlink control message from a second transmission reception point, wherein at least one of the first downlink control message or the second downlink control message comprises two or more downlink control message transmissions;

means for identifying a last downlink control information transmission of the first downlink control message and a last downlink control information transmission of the second downlink control message;
means for identifying that downlink control information of the first downlink control message comprises a first resource indication value and that downlink control information of the second downlink control message comprises a second resource indication value, wherein identifying the first resource indication value is based at least in part on identifying the last downlink control information transmission of the first downlink control message and identifying the second resource indication value is based at least in part on identifying the last downlink control information transmission of the second downlink control message;
means for determining, based at least in part on the first resource indication value and the second resource indication value, that the downlink control information of the first downlink control message is associated with the first transmission reception point and the downlink control information of the second downlink control message is associated with the second transmission reception point; and
means for transmitting, based at least in part on the first resource indication value and the second resource indication value, a first uplink control message and a second uplink control message.

48. An apparatus for wireless communication at a user equipment (UE), comprising:
means for receiving a first downlink control message from a first transmission reception point and a second downlink control message from a second transmission reception point;
means for receiving a radio resource control message comprising an indication of semi-static coordination and a splitting of resources between the first transmission reception point and the second transmission reception point;
means for determining, based at least in part on the indication, a first configured resource set for the first transmission reception point and a second configured resource set for the second transmission reception point;
means for determining that downlink control information of the first downlink control message is associated with the first transmission reception point and that downlink control information of the second downlink control message is associated with the second transmission reception point;
means for identifying a first index value in the downlink control information of the first downlink control message and a second index value in the downlink control information of the second downlink control message; and
means for transmitting a first uplink control message based at least in part on the first index value and the first configured resource set, and a second uplink control message based at least in part on the second index value and the second configured resource set.

49. A non-transitory computer-readable medium storing code for wireless communication at a user equipment (UE), the code comprising instructions executable by a processor to:
receive a first downlink control message from a first transmission reception point and a second downlink control message from a second transmission reception point, wherein at least one of the first downlink control message or the second downlink control message comprises two or more downlink control message transmissions;
identify a last downlink control information transmission of the first downlink control message and a last downlink control information transmission of the second downlink control message;
determine that downlink control information of the first downlink control message comprises a first resource indication value for the first transmission reception point and that downlink control information of the second downlink control message comprises a second resource indication value for the second transmission reception point, wherein determining the first resource indication value is based at least in part on identifying the last downlink control information transmission of the first downlink control message and determining the second resource indication value is based at least in part on identifying the last downlink control information transmission of the second downlink control message;
determine, based at least in part on the first resource indication value and the second resource indication value, that the downlink control information of the first downlink control message is associated with the first transmission reception point and the downlink control information of the second downlink control message is associated with the second transmission reception point;
identify a first resource of a first resource group associated with the first resource indication value and a second resource of a second resource group associated with the second resource indication value; and
transmit, based at least in part on the first resource of the first resource group and the second resource of the second resource group, a first uplink control message and a second uplink control message.

50. A non-transitory computer-readable medium storing code for wireless communication at a user equipment (UE), the code comprising instructions executable by a processor to:
receive a first downlink control message from a first transmission reception point and a second downlink control message from a second transmission reception point, wherein at least one of the first downlink control message or the second downlink control message comprises two or more downlink control message transmissions;
identify a last downlink control information transmission of the first downlink control message and a last downlink control information transmission of the second downlink control message;
identify that downlink control information of the first downlink control message comprises a first resource indication value and that downlink control information of the second downlink control message comprises a second resource indication value, wherein identifying the first resource indication value is based at least in part on identifying the last downlink control information transmission of the first downlink control message and identifying the second resource indication value is based at least in part on identifying the last downlink control information transmission of the second downlink control message;
determine, based at least in part on the first resource indication value and the second resource indication value, that the downlink control information of the first downlink control message is associated with the first transmission reception point and the downlink control information of the second downlink control message is associated with the second transmission reception point; and transmit, based at least in part on the first resource indication value and the second resource indication value, a first uplink control message and a second uplink control message.

51. A non-transitory computer-readable medium storing code for wireless communication at a user equipment (UE), the code comprising instructions executable by a processor to:

receive a first downlink control message from a first transmission reception point and a second downlink control message from a second transmission reception point;

receive a radio resource control message comprising an indication of semi-static coordination and a splitting of resources between the first transmission reception point and the second transmission reception point;

determine, based at least in part on the indication, a first configured resource set for the first transmission reception point and a second configured resource set for the second transmission reception point;

determine that downlink control information of the first downlink control message is associated with the first transmission reception point and that downlink control information of the second downlink control message is associated with the second transmission reception point;

identify a first index value in the downlink control information of the first downlink control message and a second index value in the downlink control information of the second downlink control message; and transmit a first uplink control message based at least in part on the first index value and the first configured resource set, and a second uplink control message based at least in part on the second index value and the second configured resource set.

* * * * *